(12) United States Patent
Patnaik

(10) Patent No.: US 11,854,319 B2
(45) Date of Patent: *Dec. 26, 2023

(54) SELF-DRIVING VEHICLES AND WEIGH STATION OPERATION

(71) Applicant: WAYMO LLC, Mountain View, CA (US)

(72) Inventor: Vijaysai Patnaik, San Francisco, CA (US)

(73) Assignee: Waymo LLC, Mountain View, CA (US)

(*) Notice: Subject to any disclaimer, the term of this patent is extended or adjusted under 35 U.S.C. 154(b) by 59 days.

This patent is subject to a terminal disclaimer.

(21) Appl. No.: 17/581,217

(22) Filed: Jan. 21, 2022

(65) Prior Publication Data

US 2022/0207936 A1 Jun. 30, 2022

Related U.S. Application Data

(63) Continuation of application No. 16/715,395, filed on Dec. 16, 2019, now Pat. No. 11,263,838.

(51) Int. Cl.
*G07C 5/08* (2006.01)
*G01G 19/02* (2006.01)
(Continued)

(52) U.S. Cl.
CPC ........ *G07C 5/0841* (2013.01); *G01G 19/022* (2013.01); *G05D 1/0212* (2013.01);
(Continued)

(58) Field of Classification Search
CPC ........ G07C 5/0841; G07C 5/008; G07C 5/02; G07C 5/0825; G01G 19/022; G01G 19/02;
(Continued)

(56) References Cited

U.S. PATENT DOCUMENTS 5,815,071 A 9/1998 Doyle
6,477,452 B2 11/2002 Good
(Continued)

FOREIGN PATENT DOCUMENTS

EP 3142078 A1 3/2017
WO 2013169738 A1 11/2013

*Primary Examiner* — Tyler D Paige
(74) *Attorney, Agent, or Firm* — Botus Churchill IP Law LLP

(57) ABSTRACT

The technology involves operation of a self-driving truck or other cargo vehicle when it is being inspected at a weigh station. This may include determining whether a weigh station is open for inspection. Once at the weigh station, the vehicle may follow instructions of an inspection officer or autonomous inspection system. The vehicle may perform predefined actions or operations so that various vehicle systems and safety issues can be evaluated, such as the brakes, lights, tires, connections between the tractor and trailer, exposed fuel tanks, leaks, etc. A visual inspection may be performed to ensure the load is secured, vehicle and cargo documents meet certain criteria, and the carrier's safety record meets any requirements. In addition, the weigh station itself may be operated in a partly or fully autonomous mode when dealing with autonomous and manually driven vehicles.

20 Claims, 16 Drawing Sheets

(51) Int. Cl.
*G05D 1/02* (2020.01)
*G07C 5/00* (2006.01)
*G07C 5/02* (2006.01)

(52) U.S. Cl.
CPC ........... *G05D 1/0276* (2013.01); *G07C 5/008* (2013.01); *G07C 5/02* (2013.01); *G07C 5/0825* (2013.01)

(58) Field of Classification Search
CPC ............... G05D 1/0212; G05D 1/0276; B64U 2101/30; B60W 50/0205; B60W 2050/021; B60W 50/04; B60W 2300/14; B60W 2556/10; B60W 2556/50; B60W 60/0025; B64C 39/024
USPC ........................................................... 701/24
See application file for complete search history.

(56) References Cited

U.S. PATENT DOCUMENTS

| | | |
|---|---|---|
| 6,980,093 B2 | 12/2005 | Oursler et al. |
| 8,295,433 B2 | 10/2012 | Linev |
| 9,176,076 B2 | 11/2015 | Roop |
| 10,108,967 B1 | 10/2018 | Harter et al. |
| 11,263,838 B2 * | 3/2022 | Patnaik ................. G01G 19/02 |
| 11,580,484 B2 | 2/2023 | Patnaik et al. |
| 2001/0010028 A1 | 7/2001 | Thibault |
| 2002/0016655 A1 | 2/2002 | Joao |
| 2002/0173887 A1 | 11/2002 | Flick |
| 2006/0173721 A1 | 8/2006 | Gregg |
| 2007/0038351 A1 * | 2/2007 | Larschan ............... G06Q 10/06 701/33.4 |
| 2012/0139696 A1 * | 6/2012 | McQuade ............. G07C 5/008 340/5.7 |
| 2015/0170521 A1 | 6/2015 | McQuade et al. |
| 2017/0103265 A1 | 4/2017 | Channah et al. |
| 2019/0066401 A1 | 2/2019 | Seaman et al. |
| 2019/0227570 A1 | 7/2019 | Miller et al. |
| 2019/0228595 A1 | 7/2019 | Mallela et al. |
| 2019/0235504 A1 | 8/2019 | Carter et al. |
| 2019/0318311 A1 * | 10/2019 | Chen .................. G06Q 10/0838 |
| 2020/0254619 A1 | 8/2020 | Grundfest et al. |
| 2021/0080960 A1 | 3/2021 | Ganesh et al. |
| 2021/0197852 A1 | 7/2021 | Fairfield et al. |

* cited by examiner

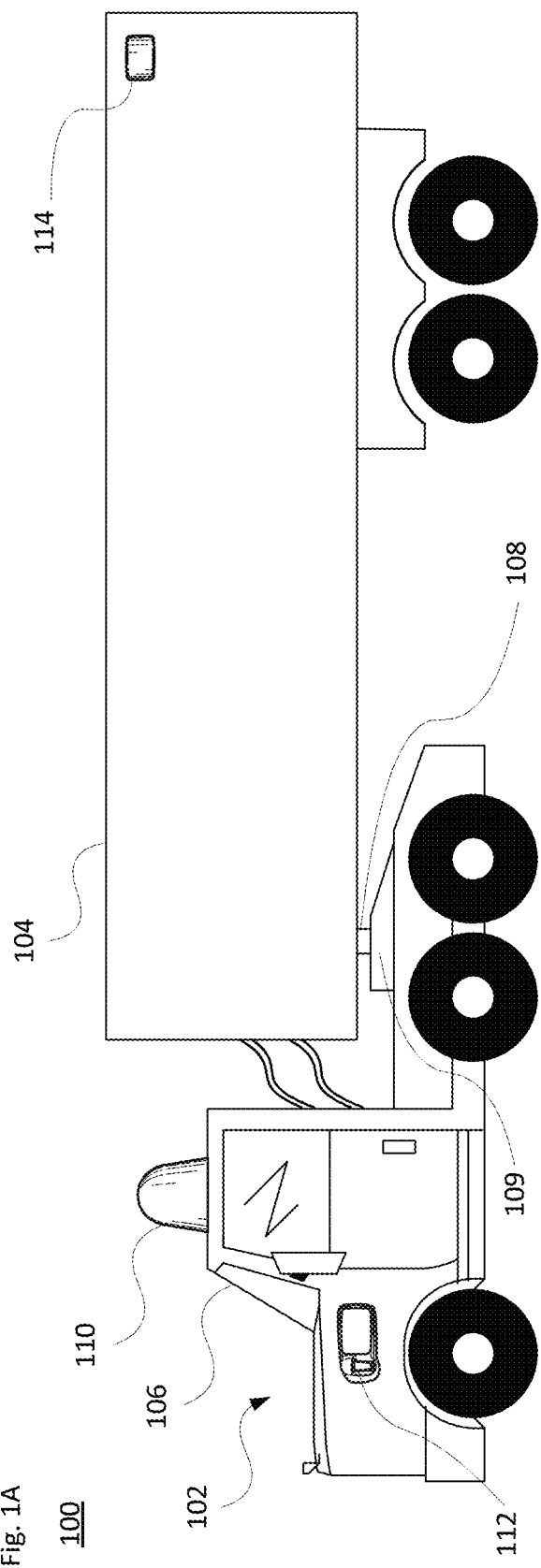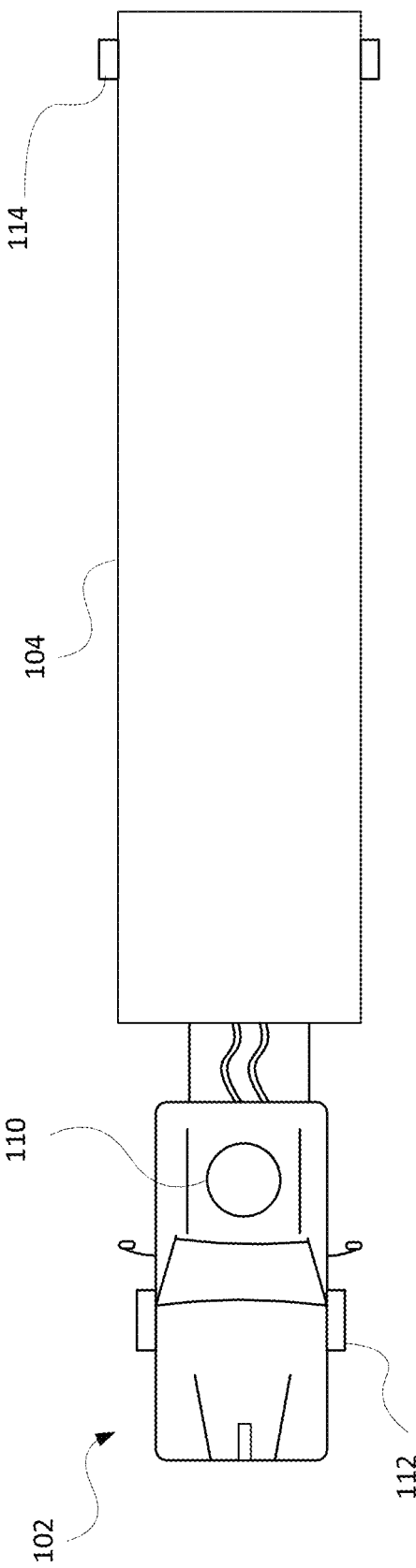

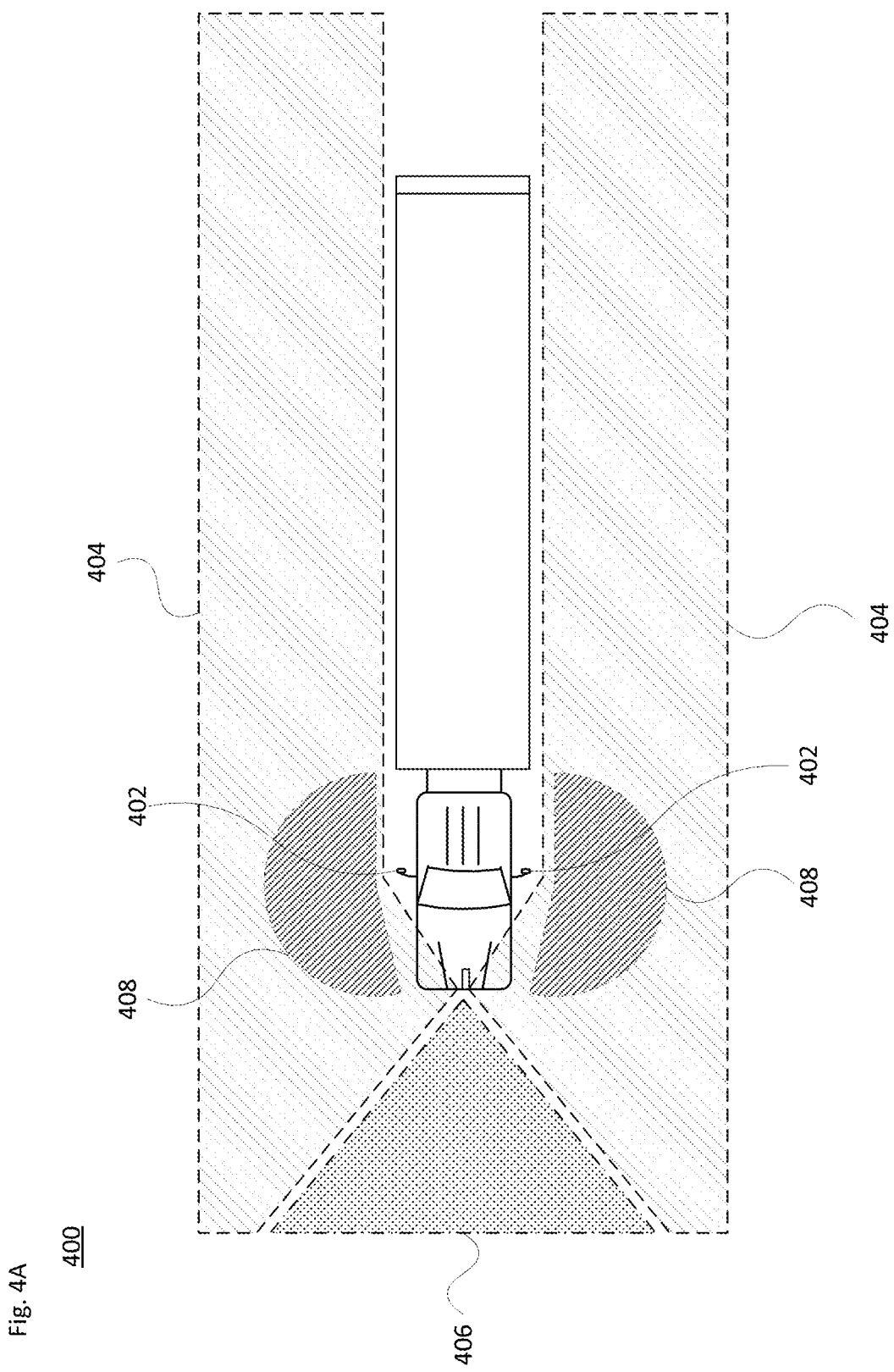

410

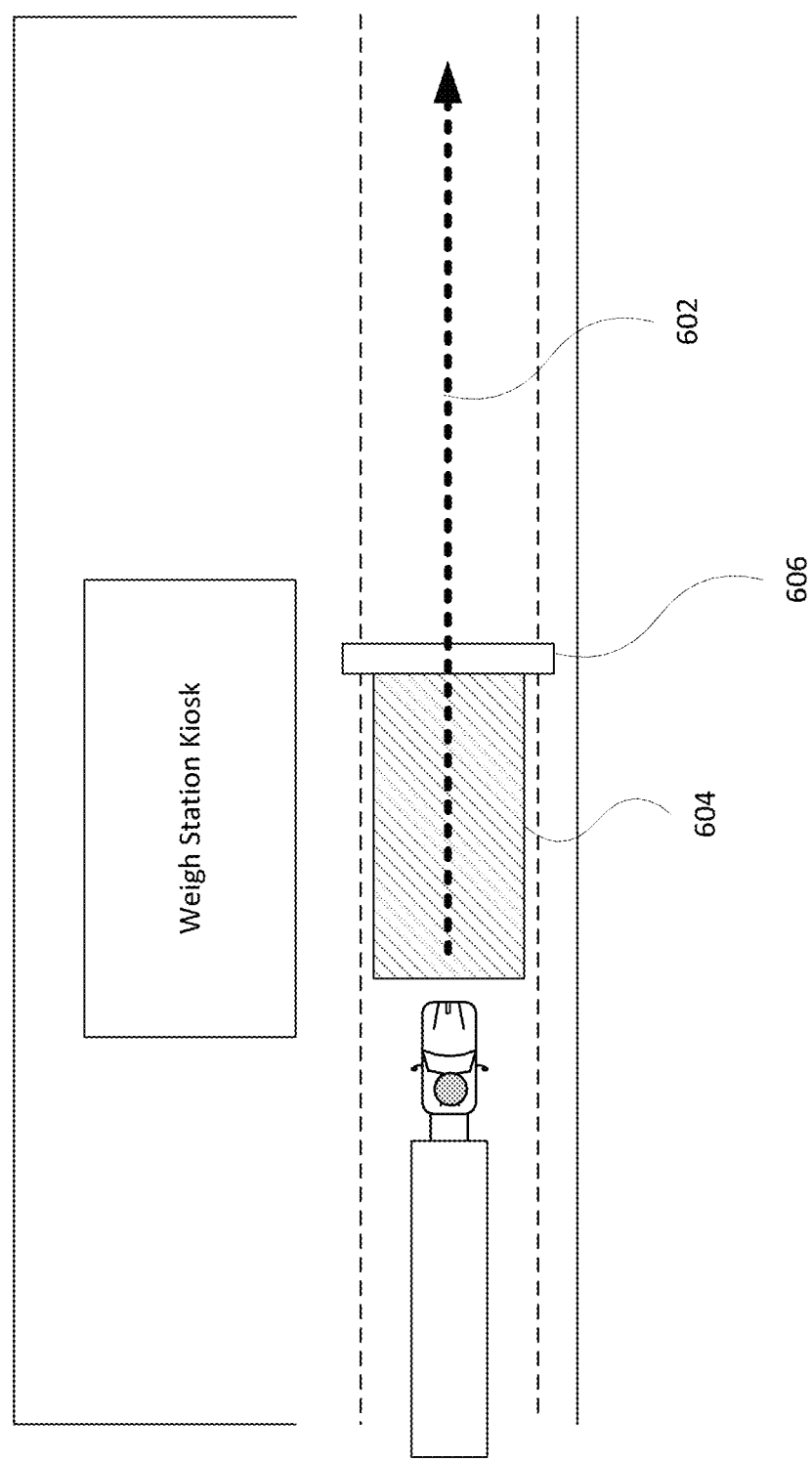

650

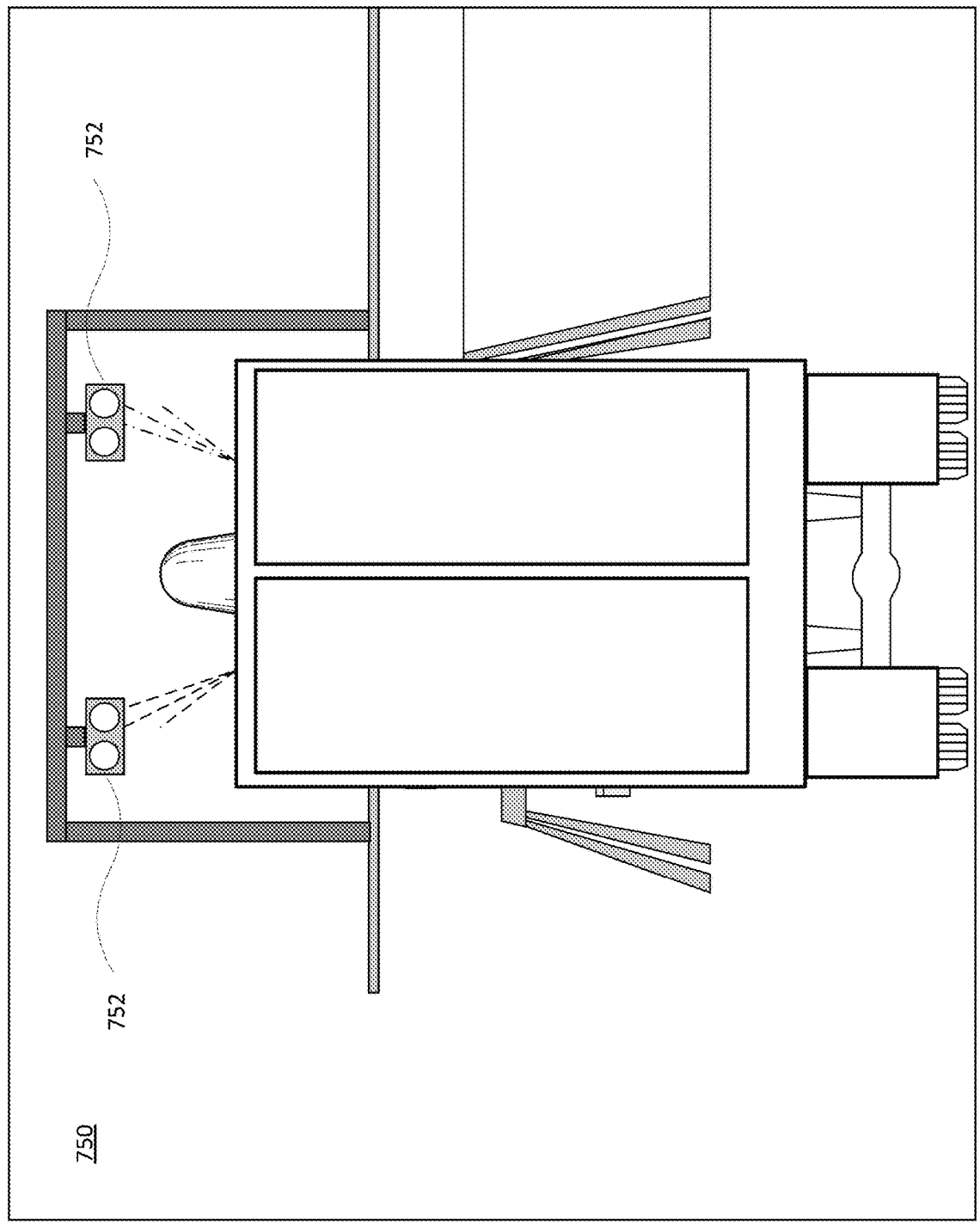

SELF-DRIVING VEHICLES AND WEIGH STATION OPERATION

CROSS REFERENCE TO RELATED APPLICATIONS

This application is a continuation of U.S. application Ser. No. 16/715,395, filed Dec. 16, 2019, the entire disclosure of which is incorporated by reference herein.

BACKGROUND

Autonomous vehicles, such as vehicles that do not require a human driver, can be used to aid in the transport of trailered (e.g., towed) cargo, such as freight, livestock or other items from one location to another. Such vehicles may operate in a fully autonomous mode or a partially autonomous mode where a person may provide some driving input. These types of vehicles may be subject to inspection at weigh stations where various aspects of the vehicle and its cargo are checked, along with driver documentation. Weigh stations are often located along state and federal highways. However, without a human driver, it may be very difficult to properly inspect a self-driving cargo truck.

BRIEF SUMMARY

Aspects of the technology relate to self-driving cargo trucks and similar vehicles (SDVs) and, in particular, how weigh stations can handle such vehicles, especially when there is no driver present. For instance, in addition to weighing the vehicle, a safety inspection may be performed which evaluates the brakes, lights, tires, connections between the tractor and trailer (e.g., electrical and pneumatic connections, and whether the kingpin is properly locked), exposed fuel tanks, leaks, etc. A visual inspection may be performed to ensure the load is secured, vehicle documents are up to date (e.g., bill of lading), the driver's documents (e.g., CDL, medical test info, hours of service) are satisfactory, and the carrier's safety record meets any requirements. While an SDV may not have a driver whose documents need to be checked, there may be additional requirements to be satisfied before the vehicle is permitted back on the road. In addition, while existing weigh stations may be manually operated, in accordance with aspects of the technology the weigh station itself may be operated in a partly or fully autonomous mode, which can further complicate the vehicle check process for an SDV.

According to one aspect, a method of operating a self-driving cargo vehicle in a fully autonomous driving mode is provided. The method comprises receiving, by one or more processors of the vehicle, sensor information from a perception system of the vehicle; determining that a weigh station is open for inspection of the vehicle; causing, by the one or more processors, a driving system of the vehicle to drive to the weigh station in the fully autonomous driving mode based at least in part on the received sensor information; receiving, by the one or more processors, a request at the weigh station to do at least one of (i) performing an operation to check a status of a vehicle component, (ii) performing an operation to check a status of cargo, (iii) providing log data to check a status of the vehicle component, (iv) providing imagery to check a status of the cargo, or (v) providing documentation regarding at least one of the vehicle or the cargo; in response to the received request, the one or more processors either causing the vehicle to perform an action or provide requested information; the one or more processors receiving authorization at the weigh station to depart the weigh station; and in response to the authorization, the one or more processors causing the driving system of the vehicle to depart the weigh station in the fully autonomous driving mode.

In one example, receiving the request at the weigh station includes receiving a command or instruction from an inspection officer at the weigh station. Here, the method may further include using one or more sensors of the perception system to identify the command or instruction; and comparing, by the one or more processors, the identified command or instruction against a stored set of commands and instructions; wherein causing the vehicle to perform the action or provide the requested information is done in response to the comparing.

In another example, the method further comprises authenticating the request prior to causing the vehicle to perform the action or provide the requested information. In a further example, performing an operation to check the status of a vehicle component includes at least one of flashing lights of the vehicle, honking a horn of the vehicle, revving an engine of the vehicle, performing a driving maneuver, or performing a braking operation. In yet another example, the documentation is physical documentation. Here, providing the documentation includes opening a storage unit on the vehicle to enable access from an authorized entity at the weigh station. Alternatively, the documentation may be electronic documentation stored in memory of the vehicle. In this case, providing the documentation includes transmitting the documentation to an authorized weigh station device via a wireless or wired link.

In another example, determining that the weigh station is open for inspection of the vehicle includes at least one of: receiving a notification from a remote assistance service; sending a query requesting a status for one or more weigh stations along a planned route of the vehicle; or receiving a communication from the weigh station that the weigh station is open.

Upon determining that the weigh station is open for inspection of the vehicle, the method may also include scheduling an inspection time at the weigh station prior to arrival of the vehicle. Determining that the weigh station is open for inspection of the vehicle may include receiving information indicating at least one of a type of inspection to be conducted, a number of lanes available for inspection, or an expected wait time for inspection.

According to another aspect, a method of operating a weigh station for inspecting vehicles is provided. The method comprises providing, by a control system of the weigh station, an inspection status of the weigh station; receiving a cargo vehicle at a first location of the weigh station, the cargo vehicle operating in an autonomous driving mode; causing issuance of a request to the cargo vehicle, the request including a command or instruction to do at least one of (i) perform an operation to check a status of a vehicle component, (ii) perform an operation to check a status of cargo, (iii) provide log data to check a status of the vehicle component, (iv) provide imagery to check a status of the cargo, or (v) provide documentation regarding at least one of the vehicle or the cargo; receiving, by the control system, information from the cargo vehicle in response to the request; determining, by the control system, that the cargo vehicle has passed inspection based on the received information; and causing issuance of an instruction to the cargo vehicle to depart the weigh station upon determining that the cargo vehicle has passed inspection.

In one example, the method further comprises deploying a drone or other device to inspect one or more components of the cargo vehicle or to inspect the cargo for load securement. Determining that the cargo vehicle has passed inspection based on the received information may include comparing the received information against one or more baseline requirements. Causing issuance of the request may include instructing an inspection officer to provide the command or instruction to the cargo vehicle. Alternatively or additionally, causing issuance of the request may include the control system transmitting the request to the cargo vehicle.

In a further example, providing the inspection status of the weigh station includes broadcasting, by the control system, status information indicating at least one of a type of inspection to be conducted, a number of lanes available for inspection, or an expected wait time for inspection.

And in accordance with another aspect, a vehicle is provided that is configured to operate in a fully autonomous driving mode. The vehicle comprises a driving system, a perception system, a positioning system and a control system. The driving system includes a steering subsystem, an acceleration subsystem and a deceleration subsystem to control driving of the vehicle in the autonomous driving mode. The perception system including one or more sensors configured to detect objects in an environment external to the vehicle. The positioning system is configured to determine a current position of the vehicle. And the control system includes one or more processors. The control system is operatively coupled to the driving system, the perception system and the positioning system. The control system is configured to: receive sensor information from the perception system of the vehicle; determining that a weigh station is open for inspection of the vehicle; cause the driving system to drive to the weigh station in the fully autonomous driving mode based at least in part on the received sensor information; receive a request at the weigh station to do at least one of (i) perform an operation to check a status of a vehicle component, (ii) perform an operation to check a status of cargo, (iii) provide log data to check a status of the vehicle component, (iv) provide imagery to check a status of the cargo, or (v) provide documentation regarding at least one of the vehicle or the cargo; in response to the received request, either cause the vehicle to perform an action or provide requested information; receive authorization at the weigh station to depart the weigh station; and in response to the authorization, cause the driving system to depart the weigh station in the fully autonomous driving mode.

In one example, the request includes a command or instruction from an inspection officer at the weigh station. Here, the control system is further configured to: use one or more sensors of the perception system to identify the command or instruction; and compare the identified command or instruction against a stored set of commands and instructions. Causing the vehicle to perform the action or provide the requested information here is done in response to the comparison of the command or instruction against the stored set of commands and instructions.

In another example, the control system is further configured to authenticate the request prior to causing the vehicle to perform the action or provide the requested information. And in a further example, a determination that the weigh station is open for inspection of the vehicle includes reception of information indicating at least one of a type of inspection to be conducted, a number of lanes available for inspection, or an expected wait time for inspection.

BRIEF DESCRIPTION OF THE DRAWINGS

FIGS. 1A-B illustrates an example cargo vehicle arrangement for use with aspects of the technology.

FIGS. 4A-B illustrate example sensor fields of view for use with aspects of the technology.

FIGS. 6A-B illustrate example weigh station scenarios in accordance with aspects of the disclosure.

FIGS. 7A-B illustrate example inspection scenarios in accordance with aspects of the disclosure.

DETAILED DESCRIPTION

The technology relates to operation of an SDV when it will be inspected at a weigh station. This can include determining whether an upcoming weigh station is open for inspection and whether the vehicle will take an action prior to arriving at the weigh station. Once at the weigh station, the vehicle may follow instructions of an inspection officer. The vehicle may also perform one or more predefined actions or operations, for instance when the weigh station facility is operating in an autonomous mode without an inspection officer present. While many of the examples presented below involve commercial cargo vehicles, aspects of the technology may be employed with other types of vehicles.

Example Vehicle Systems

Figure 1C:
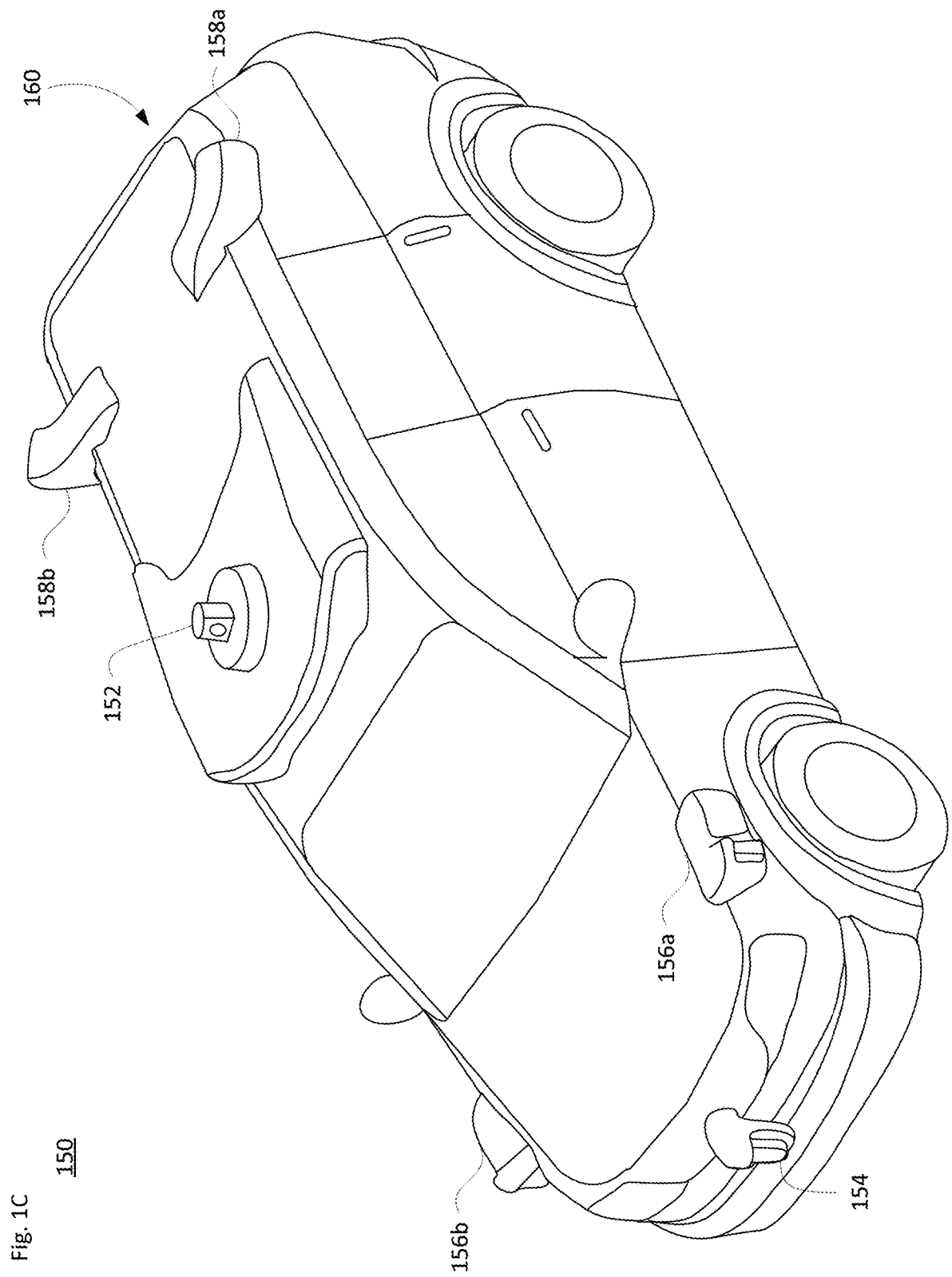
FIG. 1C illustrates an example passenger vehicle arrangement for use with aspects of the technology.

FIGS. 1A-B illustrates an example cargo vehicle 100, such as a tractor-trailer truck, and FIG. 1B illustrates an example passenger vehicle 150, such as a minivan. The cargo vehicle 100 may include, e.g., a single, double or triple trailer, or may be another medium or heavy duty truck such as in commercial weight classes 4 through 8. As shown, the truck includes a tractor unit 102 and a single cargo unit or trailer 104. The trailer 104 may be fully enclosed, open such as a flat bed, or partially open depending on the freight or other type of cargo (e.g., livestock) to be transported. The tractor unit 102 includes the engine and steering systems (not shown) and a cab 106 for a driver and any passengers. In a fully autonomous arrangement, the cab 106 may not be equipped with seats or manual driving components, since no person may be necessary.

The trailer 104 includes a hitching point 108, known as a kingpin. The kingpin is configured to pivotally attach to the tractor unit. In particular, the kingpin attaches to a trailer coupling, known as a fifth-wheel 109, that is mounted rearward of the cab. Sensor units may be deployed along the tractor unit 102 and/or the trailer 104. The sensor units are used to detect information about the surroundings around the cargo vehicle 100. For instance, as shown the tractor unit 102 may include a roof-mounted sensor assembly 110 and one or more side sensor assemblies 112, and the trailer 104 may employ one or more sensor assemblies 114, for example mounted on the left and/or right sides of the trailer 104. In some examples, the tractor unit 102 and trailer 104 also may include other various sensors for obtaining information about the tractor unit 102's and/or trailer 104's interior spaces, including the cargo hold of the trailer.

Similarly, the passenger vehicle 150 may include various sensors for obtaining information about the vehicle's external environment. For instance, a roof-top housing 152 may include a lidar sensor as well as various cameras and/or radar units. Housing 154, located at the front end of vehicle 150, and housings 156a, 156b on the driver's and passenger's sides of the vehicle may each incorporate a lidar sensor and/or other sensors such as cameras and radar. For example, housing 156a may be located in front of the driver's side door along a quarterpanel of the vehicle. As shown, the passenger vehicle 150 also includes housings 158a, 158b for radar units, lidar and/or cameras also located towards the rear roof portion of the vehicle. Additional lidar, radar units and/or cameras (not shown) may be located at other places along the vehicle 100. For instance, arrow 160 indicates that a sensor unit may be positioned along the read of the vehicle 150, such as on or adjacent to the bumper. In some examples, the passenger vehicle 150 also may include various sensors for obtaining information about the vehicle 150's interior spaces.

While certain aspects of the disclosure may be particularly useful in connection with specific types of vehicles, the vehicle may be any type of vehicle including, but not limited to, cars, trucks, motorcycles, buses, recreational vehicles, etc.

Figure 2A:
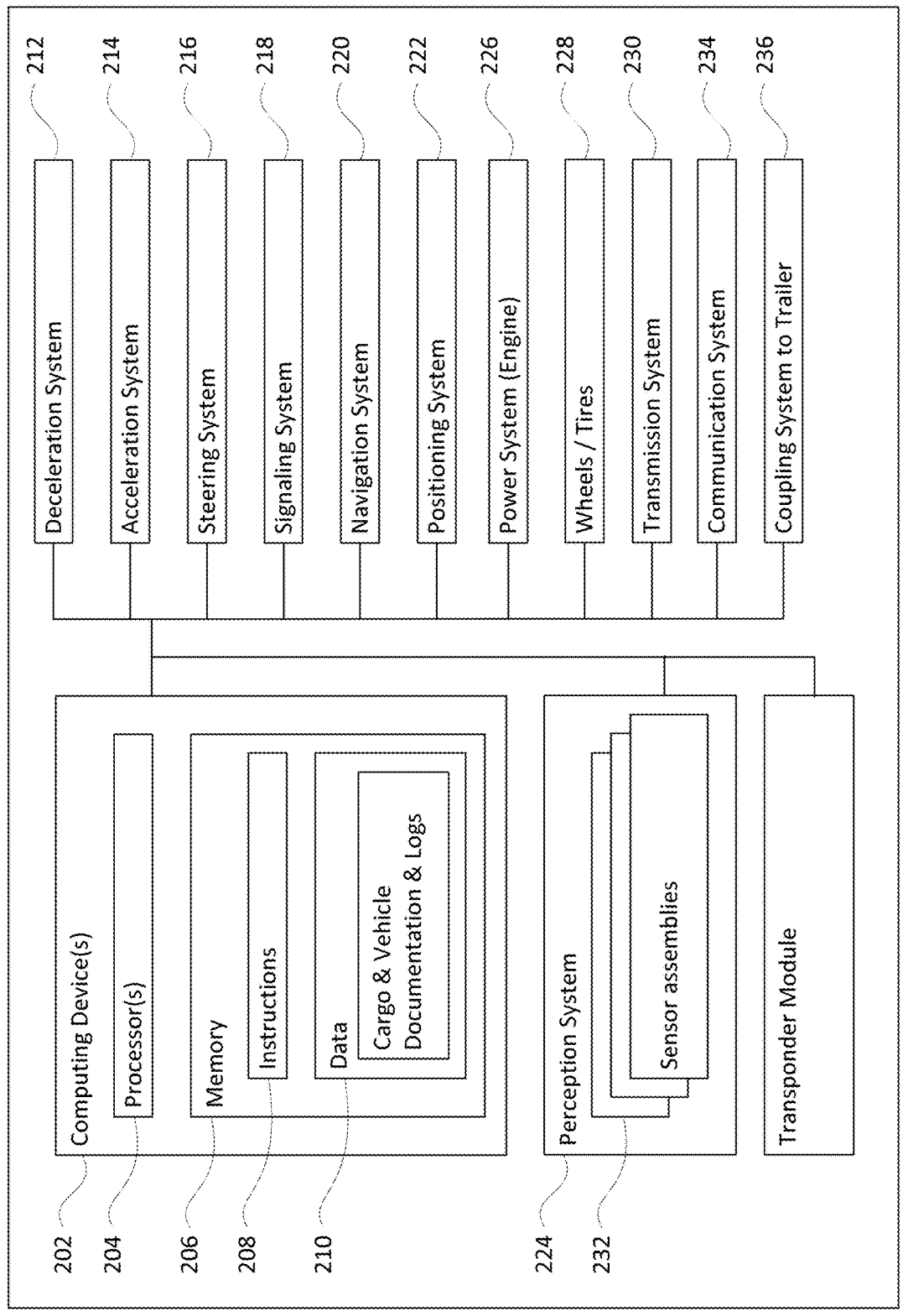
FIGS. 2A-B are functional diagrams of an example tractor-trailer vehicle in accordance with aspects of the disclosure.

FIG. 2A illustrates a block diagram 200 with various components and systems of a cargo vehicle (e.g., as shown in FIGS. 1A-B), such as a truck, farm equipment or construction equipment, configured to operate in a fully or semi-autonomous mode of operation. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

As shown in the block diagram of FIG. 2A, the vehicle includes a control system of one or more computing devices, such as computing devices 202 containing one or more processors 204, memory 206 and other components typically present in general purpose computing devices. The control system may constitute an electronic control unit (ECU) of a tractor unit or other computing system of the vehicle. The memory 206 stores information accessible by the one or more processors 204, including instructions 208 and data 210 that may be executed or otherwise used by the processor 204. The memory 206 may be of any type capable of storing information accessible by the processor, including a computing device-readable medium. The memory is a non-transitory medium such as a hard-drive, memory card, optical disk, solid-state, tape memory, or the like. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation. As illustrated in FIG. 2A, the data may include documentation, logs or other information about the cargo (e.g., cargo type, total weight, perishability, etc.) and/or the vehicle (e.g., unloaded weight, trip and/or total mileage, planned route, component status, etc.).

The one or more processor 204 may be any conventional processors, such as commercially available CPUs. Alternatively, the one or more processors may be a dedicated device such as an ASIC or other hardware-based processor. Although FIG. 2A functionally illustrates the processor(s), memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle. For example, returning to FIG. 2A, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle).

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other transmission system 230 that includes various components between an engine of the vehicle and the wheels of the vehicle. Again, by controlling these systems, computing devices 202 may also control the transmission system 230 of the vehicle in order to maneuver the vehicle autonomously.

As an example, computing devices 202 may interact with deceleration system 212 and acceleration system 214 in order to control the speed of the vehicle. Similarly, steering system 216 may be used by computing devices 202 in order to control the direction of vehicle. For example, if the vehicle is configured for use on a road, such as a tractor-trailer truck or a construction vehicle, the steering system 216 may include components to control the angle of wheels of the tractor unit 102 to turn the vehicle. Signaling system 218 may be used by computing devices 202 in order to signal the vehicle's intent to other drivers or vehicles, for example, by lighting turn signals or brake lights when needed.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 224 also includes sensors for detecting objects external to the vehicle. The detected objects may be other vehicles, obstacles in the roadway, traffic signals, signs, trees, etc. For example, the perception system 224 may include one or more lidar sensors, sonar devices, radar units, cameras (e.g., optical and/or infrared), acoustic sensors, inertial sensors (e.g., gyroscopes or accelerometers), and/or any other detection devices that record data which may be processed by computing devices 202. The sensors of the perception system 224 may detect objects and their characteristics such as location, orientation, size, shape, type (for instance, vehicle, pedestrian, bicyclist, etc.), heading, and speed of movement, etc. The raw data from the sensors and/or the aforementioned characteristics can sent for further processing to the computing devices 202 periodically and continuously as it is generated by the perception system 224. Computing devices 202 may use the positioning system 222 to determine the vehicle's location and perception system 224 to detect and respond to objects when needed to reach the location safely. In addition, the computing devices 202 may perform calibration of individual sensors, all sensors in a particular sensor assembly, or between sensors in different sensor assemblies.

As indicated in FIG. 2A, the sensors of the perception system 224 may be incorporated into one or more sensor assemblies 232. In one example, the sensor assemblies 232 may be arranged as sensor towers integrated into the side-view mirrors on the truck, farm equipment, construction equipment or the like. Sensor assemblies 232 may also be positioned at different locations on the tractor unit 102 or on the trailer 104 (see FIGS. 1A-B), or along different portions of passenger vehicle 150 (see FIG. 1C). The computing devices 202 may communicate with the sensor assemblies located on both the tractor unit 102 and the trailer 104 or distributed along the passenger vehicle 150. Each assembly may have one or more types of sensors such as those described above.

Also shown in FIG. 2A is a communication system 234 and a coupling system 236 for connectivity between the tractor unit and the trailer. The coupling system 236 includes a fifth-wheel at the tractor unit and a kingpin at the trailer. The communication system 234 may include one or more wireless network connections to facilitate communication with other computing devices, such as passenger computing devices within the vehicle, and computing devices external to the vehicle, such as in another nearby vehicle on the roadway or at a remote network. The network connections may include short range communication protocols such as Bluetooth™, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 2B:
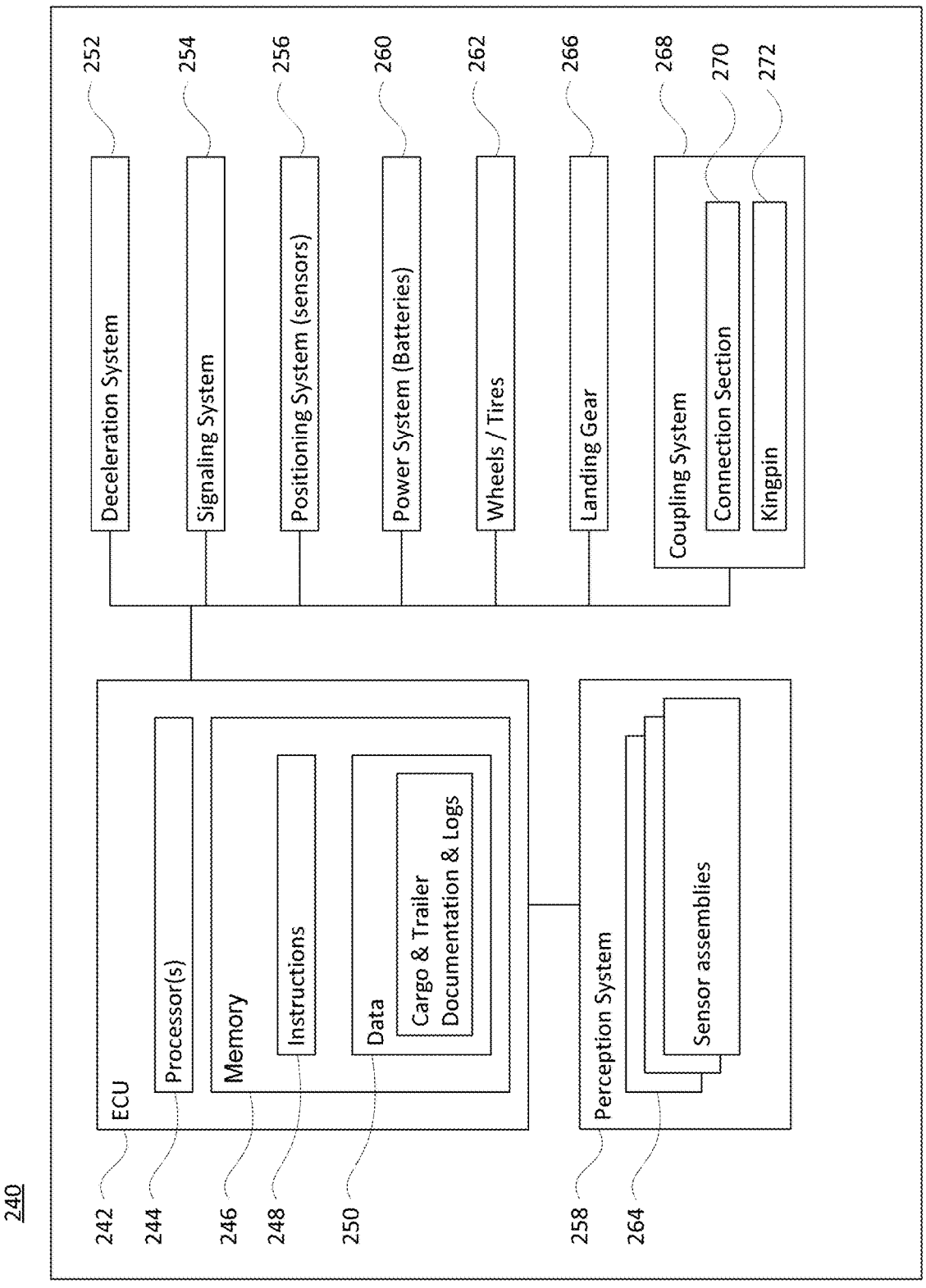

FIG. 2B illustrates a block diagram 240 of an example trailer. As shown, the system includes an ECU 242 of one or more computing devices, such as computing devices containing one or more processors 244, memory 246 and other components typically present in general purpose computing devices. The memory 246 stores information accessible by the one or more processors 244, including instructions 248 and data 250 that may be executed or otherwise used by the processor(s) 244. The descriptions of the processors, memory, instructions and data from FIG. 2A apply to these elements of FIG. 2B. As illustrated in FIG. 2B, the data 250 may include documentation, logs or other information about the cargo (e.g., cargo type, total weight, perishability, etc.) and/or the trailer (e.g., unloaded weight, dimensions, trip and/or total mileage, component status, etc.).

The ECU 242 is configured to receive information and control signals from the trailer unit. The on-board processors 244 of the ECU 242 may communicate with various systems of the trailer, including a deceleration system 252 (for controlling braking of the trailer), signaling system 254 (for controlling turn signals), and a positioning system 256 (for determining the position of the trailer). The ECU 242 may also be operatively coupled to a perception system 258 (for detecting objects in the trailer's environment) and a power system 260 (for example, a battery power supply) to provide power to local components. Some or all of the wheels/tires 262 of the trailer may be coupled to the deceleration system 252, and the processors 244 may be able to receive information about tire pressure, balance, wheel speed and other factors that may impact driving in an autonomous mode, and to relay that information to the processing system of the tractor unit. The deceleration system 252, signaling system 254, positioning system 256, perception system 258, power system 260 and wheels/tires 262 may operate in a manner such as described above with regard to FIG. 2A. For instance, the perception system 258, if employed as part of the trailer, may include at least one sensor assembly 264 having one or more lidar sensors, sonar devices, radar units, cameras, inertial sensors, and/or any other detection devices that record data which may be processed by the ECU 242 or by the processors 204 of the tractor unit.

The trailer may also include a set of landing gear 266, as well as a coupling system 268. The landing gear 266 provide a support structure for the trailer when decoupled from the tractor unit. The coupling system 268, which may be a part of coupling system 236 of the tractor unit, provides connectivity between the trailer and the tractor unit. The coupling system 268 may include a connection section 270 to provide backward compatibility with legacy trailer units that may or may not be capable of operating in an autonomous mode. The coupling system includes a kingpin 272 configured for enhanced connectivity with the fifth-wheel of an autonomous-capable tractor unit.

Figure 3:
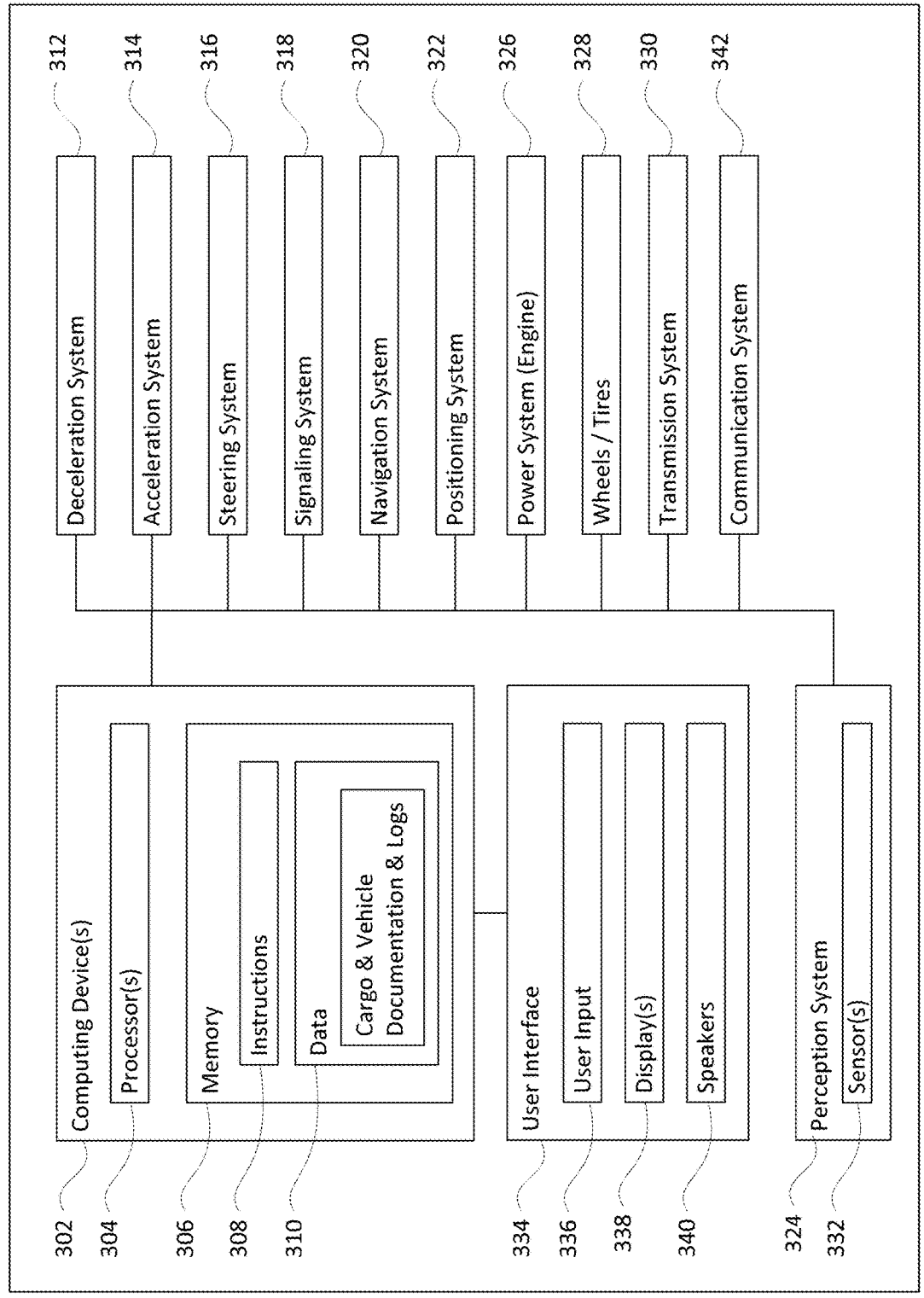
FIG. 3 is a function diagram of an example passenger vehicle in accordance with aspects of the disclosure.

FIG. 3 illustrates a block diagram 300 of various systems of a passenger vehicle. As shown, the system includes one or more computing devices 302, such as computing devices containing one or more processors 304, memory 306 and other components typically present in general purpose computing devices. The memory 306 stores information accessible by the one or more processors 304, including instructions 308 and data 310 that may be executed or otherwise used by the processor(s) 304. The descriptions of the processors, memory, instructions and data from FIG. 2A apply to these elements of FIG. 3.

As with the computing devices 202 of FIG. 2A, the computing devices 302 of FIG. 3 may control computing devices of an autonomous driving computing system or incorporated into a passenger vehicle. The autonomous driving computing system may be capable of communicating with various components of the vehicle in order to control the movement of the passenger vehicle according to primary vehicle control code of memory 306. For example, computing devices 302 may be in communication with various, such as deceleration system 312, acceleration system 314, steering system 316, signaling system 318, navigation system 320, positioning system 322, perception system 324, power system 326 (e.g., the vehicle's engine or motor), transmission system 330 in order to control the movement, speed, etc. of the in accordance with the instructions 208 of memory 306. The wheels/tires 328 may be controlled directly by the computing devices 302 or indirectly via these other systems. These components and subsystems may operate as described above with regard to FIG. 2A. For instance, the perception system 324 also includes one or more sensors 332 for detecting objects external to the vehicle. The sensors 332 may be incorporated into one or more sensor assemblies as discussed above.

Computing devices 202 may include all of the components normally used in connection with a computing device such as the processor and memory described above as well as a user interface subsystem 334. The user interface subsystem 334 may include one or more user inputs 336 (e.g., a mouse, keyboard, touch screen and/or microphone) and various electronic displays 338 (e.g., a monitor having a screen or any other electrical device that is operable to display information). In this regard, an internal electronic display may be located within a cabin of the passenger vehicle (not shown) and may be used by computing devices 302 to provide information to passengers within the vehicle. Output devices, such as speaker(s) 340 may also be located within the passenger vehicle.

The passenger vehicle also includes a communication system 342, which may be similar to the communication system 234 of FIG. 2A. For instance, the communication system 342 may also include one or more wireless network connections to facilitate communication with other computing devices, such as passenger computing devices within the vehicle, and computing devices external to the vehicle, such as in another nearby vehicle on the roadway, or a remote server system. The network connections may include short range communication protocols such as Bluetooth™, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Example Implementations

In view of the structures and configurations described above and illustrated in the figures, various implementations will now be described.

In order to detect the environment and conditions around the vehicle, both while driving in an autonomous mode and when at a weigh station, different types of sensors and layouts may be employed. Examples of these were discussed above with regard to FIGS. 1-3. The field of view for each sensor can depend on the sensor placement on a particular vehicle. In one scenario, the information from one or more different kinds of sensors may be employed so that the tractor-trailer or passenger vehicle may operate in an autonomous mode. Each sensor may have a different range, resolution and/or field of view (FOV).

For instance, the sensors may include a long range FOV lidar and a short range FOV lidar. In one example, the long range lidar may have a range exceeding 50-250 meters, while the short range lidar has a range no greater than 1-50 meters. Alternatively, the short range lidar may generally cover up to 10-15 meters from the vehicle while the long range lidar may cover a range exceeding 100 meters. In another example, the long range is between 10-200 meters, while the short range has a range of 0-20 meters. In a further example, the long range exceeds 80 meters while the short range is below 50 meters. Intermediate ranges of between, e.g., 10-100 meters can be covered by one or both of the long range and short range lidars, or by a medium range lidar that may also be included in the sensor system. In addition to or in place of these lidars, a set of cameras (e.g., optical and/or infrared) may be arranged, for instance to provide forward, side and rear-facing imagery in and around the vehicle, including in the immediate vicinity of the vehicle (e.g., within less than 2-3 meters around the vehicle). Similarly, a set of radar sensors may also be arranged to provide forward, side and rear-facing data.

Figure 4B:
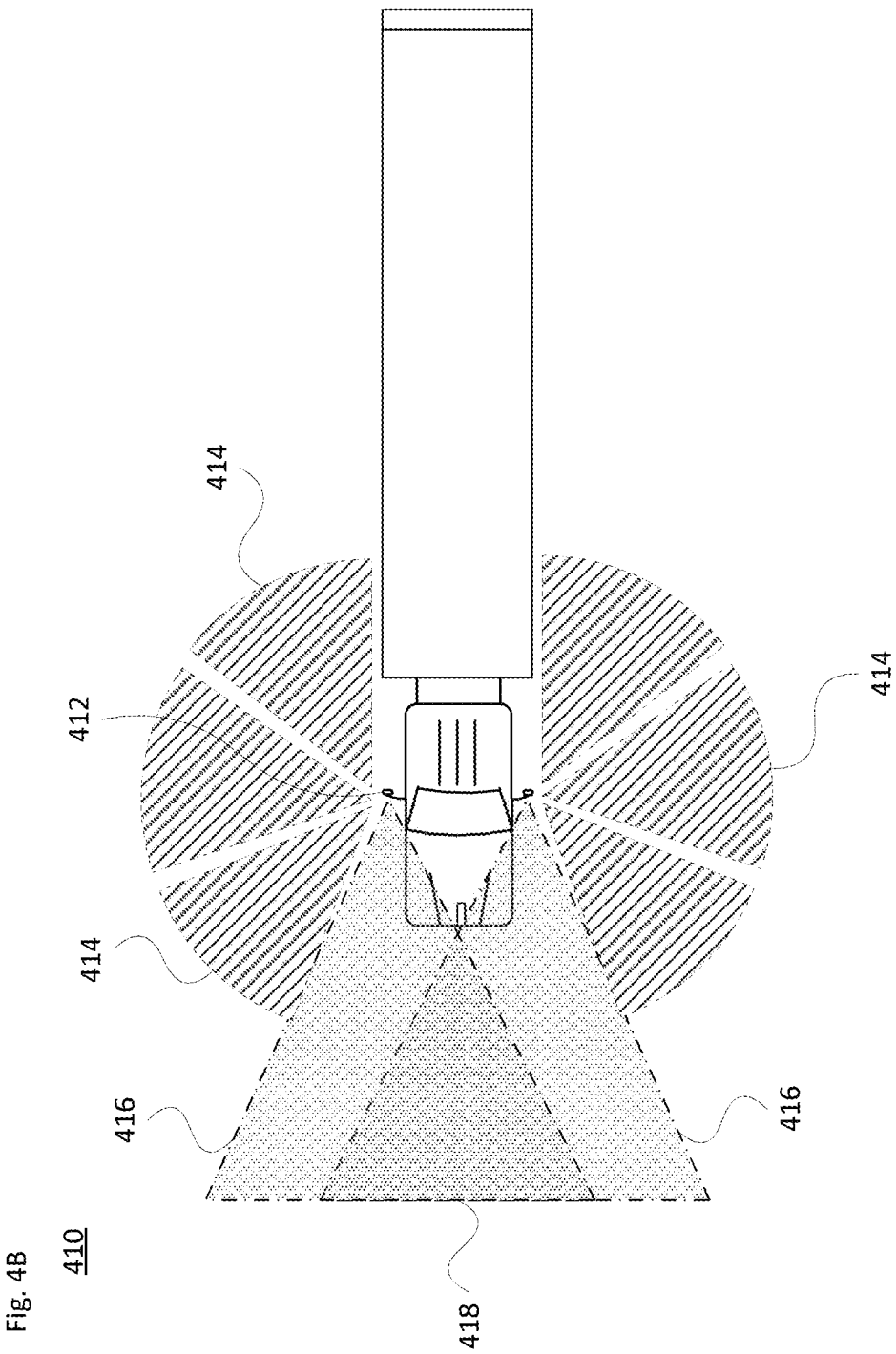

FIGS. 4A-B illustrate example sensor configurations and fields of view on a cargo vehicle. In particular, FIG. 4A presents one configuration 400 of lidar, camera and radar sensors. In this figure, one or more lidar units may be located in sensor housing 402. In particular, sensor housings 402 may be located on either side of the tractor unit cab, for instance integrated into a side view mirror assembly. In one scenario, long range lidars may be located along a top or upper area of the sensor housings 402. For instance, this portion of the housing 402 may be located closest to the top of the truck cab or roof of the vehicle. This placement allows the long range lidar to see over the hood of the vehicle. And short range lidars may be located along a bottom area of the sensor housings 402, closer to the ground, and opposite the long range lidars in the housings. This allows the short range lidars to cover areas immediately adjacent to the cab (e.g., up to 1-4 meters from the vehicle). This would allow the perception system to determine whether an object such as another vehicle, pedestrian, bicyclist, etc., is next to the front of the vehicle and take that information into account when determining how to drive or turn in view of an aberrant condition.

As illustrated in FIG. 4A, the long range lidars on the left and right sides of the tractor unit have fields of view 404. These encompass significant areas along the sides and front of the vehicle. As shown, there is an overlap region 406 of their fields of view in front of the vehicle. A space is shown between regions 404 and 406 for clarity; however in actuality there would desirably be overlapping coverage. The short range lidars on the left and right sides have smaller fields of view 408. The overlap region 406 provides the perception system with additional or information about a very important region that is directly in front of the tractor unit. This redundancy also has a safety aspect. Should one of the long range lidar sensors suffer degradation in performance, the redundancy would still allow for operation in an autonomous mode.

FIG. 4B illustrates coverage 410 for either (or both) of radar and camera sensors on both sides of a tractor-trailer. Here, there may be multiple radar and/or camera sensors in each of the sensor housings 412. As shown, there may be sensors with side and rear fields of view 414 and sensors with forward facing fields of view 416. The sensors may be arranged so that the side and rear fields of view 414 overlap, and the side fields of view may overlap with the forward facing fields of view 416. As with the long range lidars discussed above, the forward facing fields of view 416 also have an overlap region 418. This overlap region provides similar redundancy to the overlap region 406, and has the same benefits should one sensor suffer degradation in performance.

While not illustrated in FIGS. 4A-4B, other sensors may be positioned in different locations to obtain information regarding other areas around the vehicle, such as along the rear or underneath the vehicle.

Example Scenarios

For situations in which the self-driving vehicle is fully autonomous without a driver being present, it is important that the system not only determine whether the vehicle needs to pull into a weigh station for inspection, but what is required of the vehicle during inspection.

The vehicle may know about the location of a weigh station based on detailed maps stored onboard or offboard (e.g., received from the vehicle's support service, another remote assistance service or third party). Alternatively, the vehicle may receive a notification via an app or other service (such as the remote assistance service), from another vehicle along the roadway, or via a broadcast from the weigh station itself. In one scenario, even before the vehicle departs, it could send a query to the weigh stations on the planned route or a central service or database that manages weigh station information. In response, the vehicle can be informed about the status of each weigh station and determine whether it needs to stop for inspection or not. Depending on whether the vehicle needs to stop at a particular weigh station, the vehicle's control system (e.g., an onboard planner module) can make adjustments to one or more of the route, speed, travel lanes and/or other aspects of the planned trip. Thus, instead of waiting until the vehicle is near a weigh station, it can plan ahead before the trip even begins.

Figure 5:
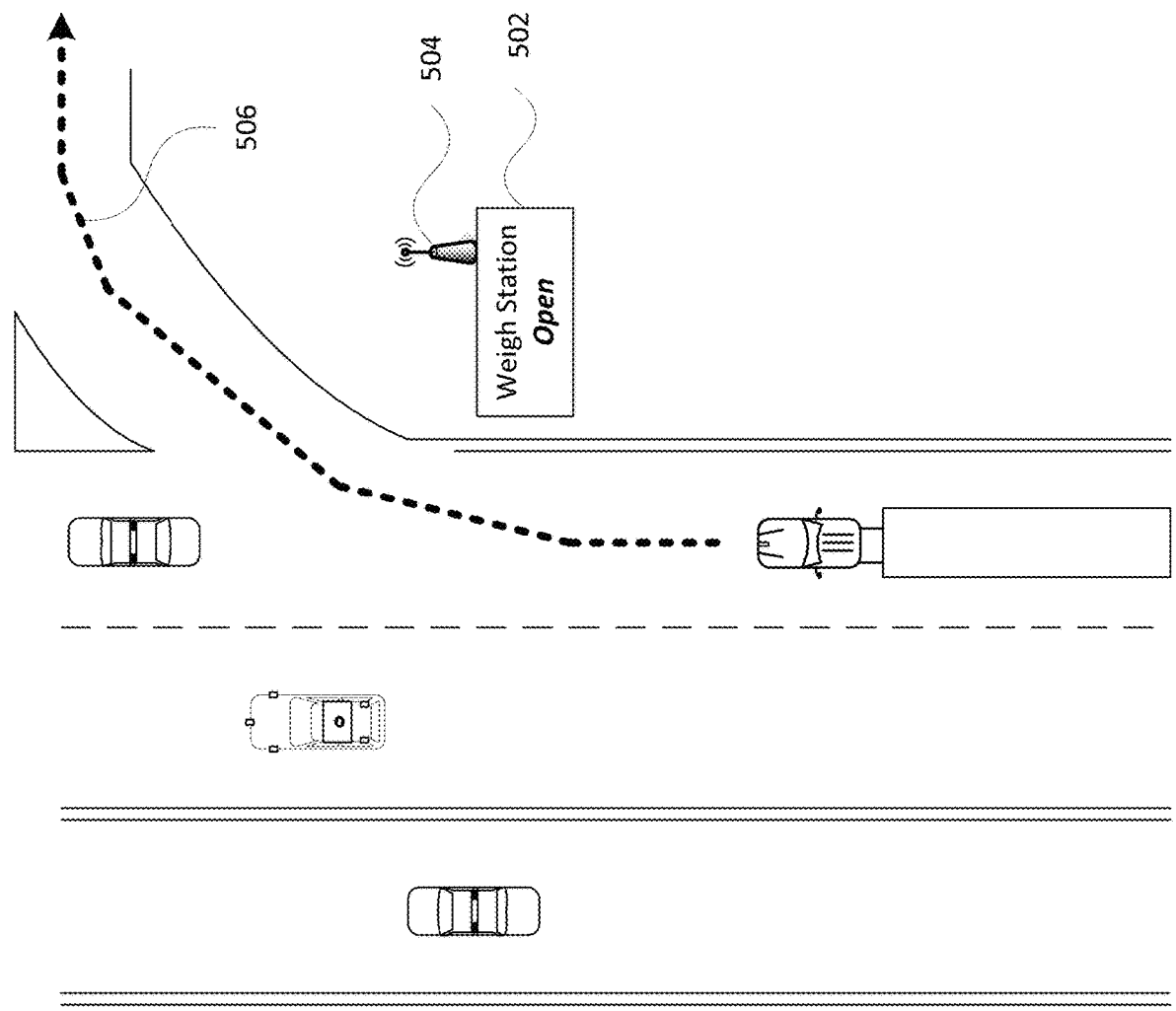
FIG. 5 illustrates an example scenario in accordance with aspects of the disclosure.

The vehicle may also determine the location of a weigh station based on information detected by its perception system. For example, the vehicle may detect the presence and/or status of a weigh station by detecting one or more signs indicating that a weigh station is present, or it's status (e.g. open/closed). The detection can be performed alternatively or in addition to using maps, apps or other a priori information about the presence of a weigh station along the route. In the example 500 of FIG. 5, the vehicle is notified that the weigh station is open and it should pull in for inspection. As shown, the notification may be done by detecting signage 502 that has a visual indicator (e.g., text, bar code, QR code, symbols, etc.) that the station is open. Alternatively or additionally, a signal transmitted via WiFi or other wireless communication link 504 may indicate the weigh station status. For instance, the signal may inform approaching trucks the type(s) of inspection to be conducted at the weigh station. It may also indicate the number of lanes available for inspection, whether other trucks are already queued up and how long the expected wait will be. The dotted arrow 506 shows that the truck will enter the weigh station.

In one scenario, the truck or other vehicle may schedule a time for inspection based on its planned route, traffic and weather conditions, the current schedule at the facility, etc. This may be arranged directly between the vehicle and the weigh station, or via a remote assistance service or other central management system. In this case, the control system of the vehicle, such as a planner module, may modify certain aspects of the trip to avoid delays at the weigh station, such as by changing speed and/or legs of the route.

FIG. 6A illustrates a first example 600 of the vehicle arriving at a weigh station. Upon arrival at the weigh station, the vehicle may follow a particular inspection process. For instance, using the onboard detailed maps and/or real-time perception information from its sensors, the vehicle may select or otherwise proceed along a particular lane at the weigh station. As noted above, the vehicle inspection may include evaluating both the vehicle itself and the cargo.

In this example, the vehicle may proceed along a path 602 to enter various inspection points. This may include stopping in area 604 to check the brakes and/or weigh the vehicle. The vehicle may then proceed through area 606, where visual and other inspections are performed. By way of example, an inspection officer may go under or around the cab and trailer to inspect various components for safety. This can include evaluating whether there is sufficient tread on the tires, whether the tires are underpressurized or flat, and whether there is any damage to the tires or rims (e.g., cracks). Visual inspection may also reveal whether any fluid is leaking (e.g., oil, fuel, antifreeze). It can also show whether any external fuel tanks are properly secured, whether the kingpin is properly locked, and whether there is any damage to springs or shocks. Driving and other active operations may be required to evaluate the brakes, lights, signals and/or other components.

The vehicle may use its perception system (e.g., lidar, cameras, radar and/or acoustical sensors) to interpret the inspection officer's commands. For instance, via object recognition (e.g., using machine learning), a standardized set of hand signals, movements, body language and/or verbal commands can be detected and identified by the system. The officer may also hold up specific signs or use information transmitted from a portable computer device (e.g., tablet PC or wearable computer). In one scenario, information associated with the set (e.g., images, audio files, classified objects) may be stored in memory of the vehicle and compared against the information received from the perception system. Should the signal, sign, command or other information be confusing or inconsistent with the abilities of the autonomous vehicle, the vehicle may request clarification from the officer or from a remote assistance service. For instance, the vehicle may emit visual or audible information requesting the officer repeat or clarify a command. Or the vehicle may transmit information to the remote assistance service regarding the received command and request that the service interpret the command and/or how the vehicle should respond.

In this example where an inspection officer is standing or walking near the vehicle, autonomous vehicle can clearly communicate to the officer (e.g., via an external visual display and/or an audible announcement) that it is stopped and will not move until it receives instruction to do so. Unlike a cargo truck operated in a manual mode by a driver, it may not be possible for the autonomous vehicle to shut down all of its systems as the officer is inspecting it. This is because in many instances the sensor suite and other systems may need to be operational during the inspection. So there can also be alternative ways to enable the officer to do the same inspection.

Figure 6B:
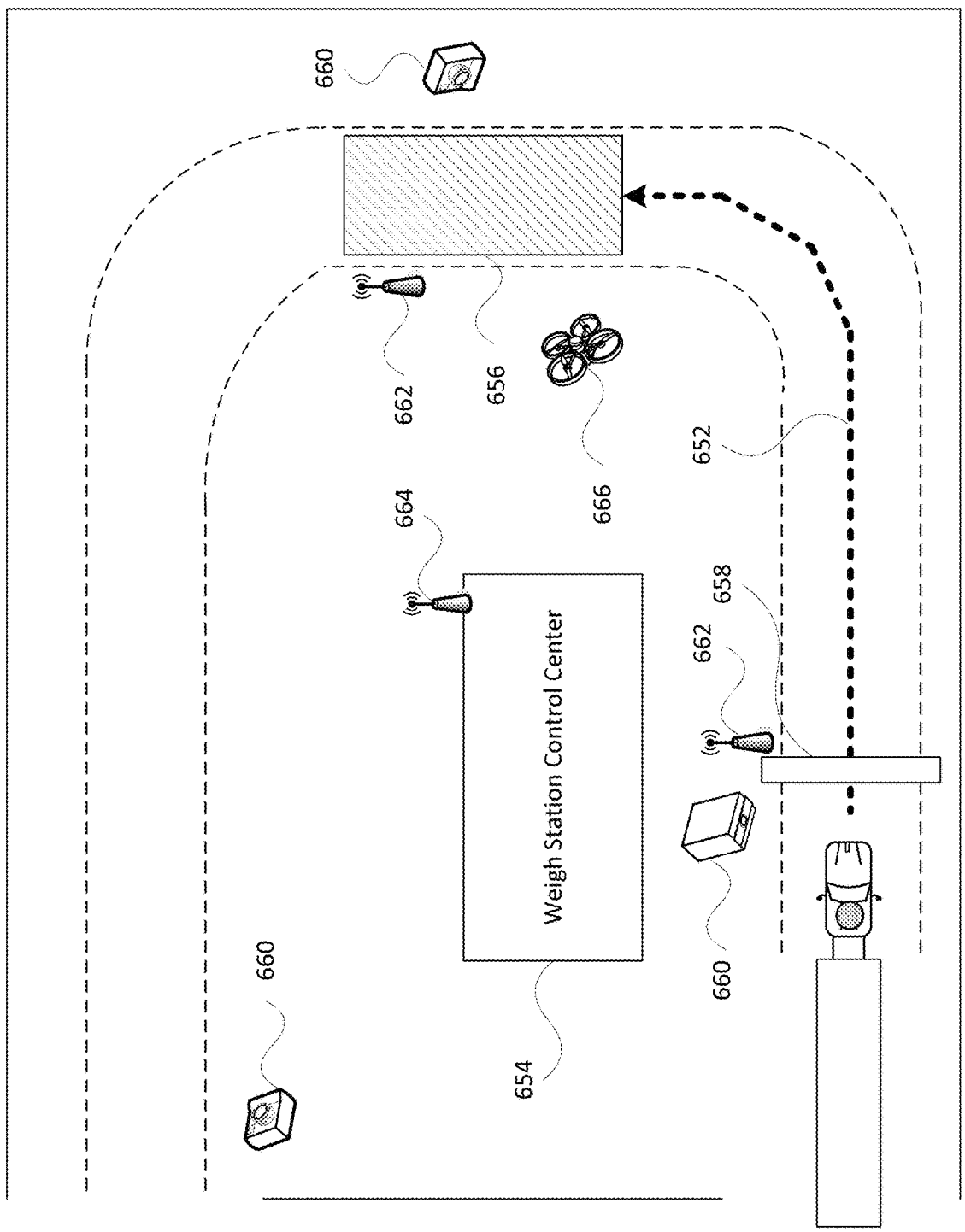

FIG. 6B illustrates another example 650, in which some or all of the inspection is performed either under the supervision of a human inspection officer or autonomously. Here, the vehicle may follow a preplanned or dynamic route 652 at the weigh station under the direction of an inspection officer or a computer system of the control center 654. In one example, the officer may remotely manage the inspection from the control center 654. Similar to FIG. 6A, the vehicle may stop in area 656 to check the brakes and/or weigh the vehicle. The vehicle may first or subsequently proceed through area 658, where visual and other inspections are performed. Cameras, lidar, thermal imagers and/or other sensors 660 may be positioned at various locations around the weigh station facility. Some or all of the inspection information may be relayed to the control center 654 and/or the vehicle via wireless transmitters or transceivers 662. In this example, the control center 654 has a transceiver 664 to provide instructions to the vehicle and/or to the various inspection elements, including, e.g., a drone or other robot 666.

Figure 7A:
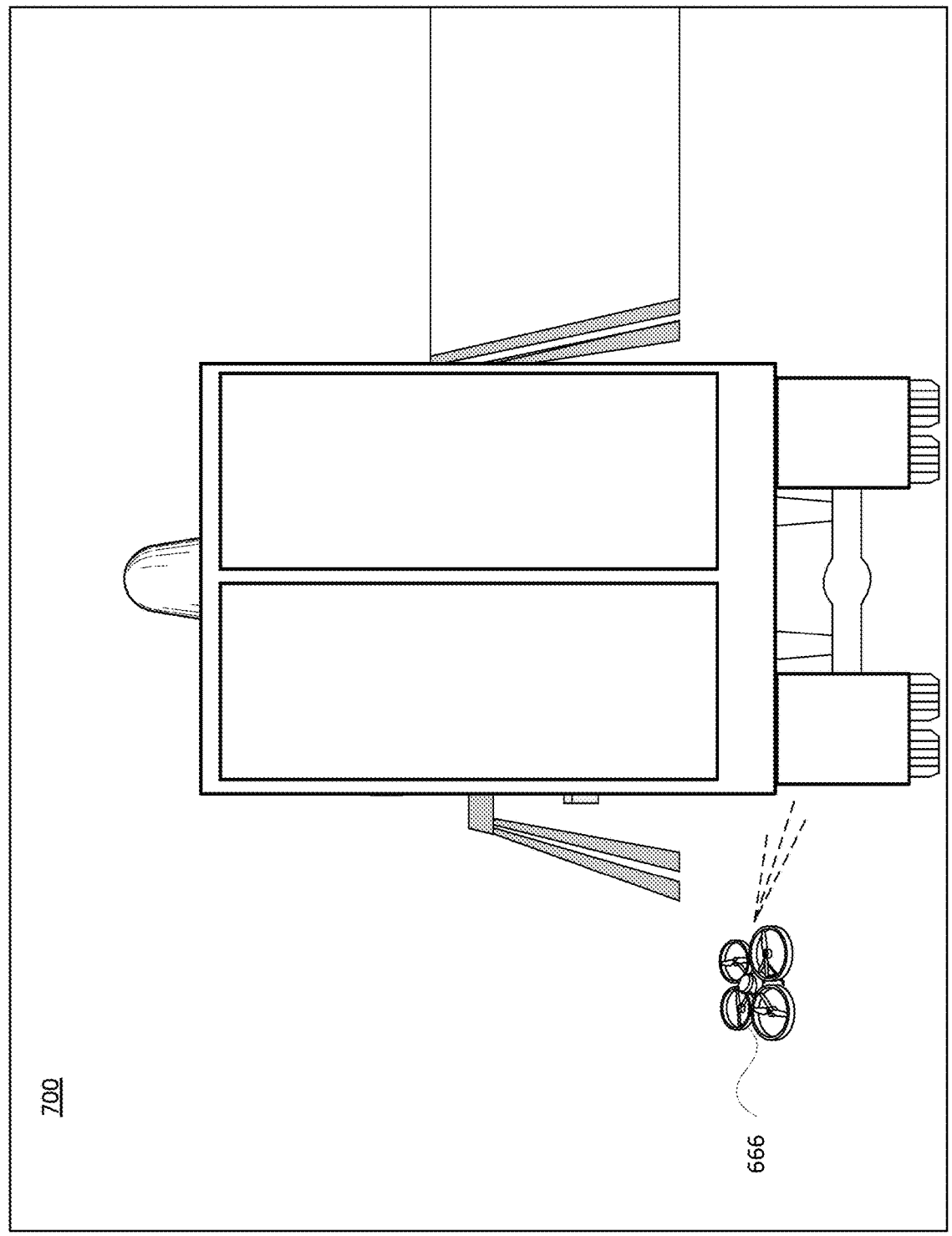

For instance, as illustrated in the example 700 of FIG. 7A, drone 666 or another device may inspect different parts of the vehicle, including the tires, cargo straps or other fasteners, interior of the trailer, etc., with optical or infrared cameras, lidar and/or other sensors. For instance, the weigh station may employ a fixed or portable thermal imaging system that can check tires and brakes and flag any issues for officers. For lights inspection, the officer or control system could require the vehicle to flash selected lights to demonstrate that they are working properly. In one aspect, an inspection procedure may be pre-programmed into the onboard computer, for instance stored in data 210 of memory 206. By way of example, when the inspecting officer initiates the inspection procedure, the vehicle would go through a pre-configured sequence of moves, e.g., flashing lights, wipers, driving in a certain loop or other pattern, etc. In some instances, a remote assistance truck support team can coordinate with the vehicle's onboard system for flashing lights on the truck and performing other requested operations.

As shown in the example 750 of FIG. 7B, the weigh station may use portable or fixed sensors 752 to detect the lights. In other examples, the vehicle may be required to perform particular operations while stationary or moving, including revving the engine, performing driving maneuvers (e.g., FIG. 8, backing up, etc.), actuating the brakes and the like.

Alternatively or additionally, the vehicle may provide log data to the weigh station that corresponds to the particular actions or tests. The log data may be acquired or stored by an electronic logging device (ELD), or by other onboard systems such as the vehicle's perception, braking, steering, signaling, positioning and/or navigation systems. For instance, braking operations over the past 1 hour, 1 day, 1 week, etc., may be shared to show that the vehicle's brakes have been working in accordance with any requirements (e.g., decelerating X mph in Y distance). Tire pressure information from the onboard TPMS module(s) can also be shared. The weigh station facility may compare the tested maneuvers/operations with the log data to validate the logs and to ensure that the vehicle's systems are in proper working order. The logs could also be shared to show the officer that the onboard systems are working as intended (e.g., show the results of actual braking vs what was commanded by the onboard self-driving system).

In addition to evaluating the truck's components, the officer or autonomous system at the weigh station may inspect the cargo and check for load securement. Here, for instance, prior to dispatch of the truck or other vehicle, images could be taken of the inside of the trailer to show the cargo and its placement. These images can be shared with the officer. Alternately or additionally, a wireless camera mounted on the inside of the trailer can provide a live feed to the officer, for instance to compare against the pre-trip imagery. Furthermore, the vehicle may be requested to perform certain driving maneuvers at the weigh station to ensure that the cargo is secure. Image analysis may be performed in real time at the weigh station to confirm that the cargo is secure.

Besides the logs and imagery, other information may also be shared with the human office or an automated system at the weigh station. By way of example, vehicle documentation including bills of lading could be secured in a box attached to the outside of the cab and can be accessed via an electronic code. The officer at the weigh station can obtain the code by contacting a truck support team for the vehicle, such as its remote assistance service, or some other authentication process may occur that authorizes the particular office. Here, the vehicle may receive approval from its remote support team and automatically unlock the secure box.

In another scenario, physical documents could be avoided and electronic documentation (and logs) can be provided to the office or the automated system at the weigh station. For instance, the officer may use a contactless near field communication (NFC) technology on his/her portable device (e.g., tablet PC or wearable computer) to engage with the vehicle and obtain the necessary information. Bluetooth™, WiFi or another wireless link could be used as well. Alternatively, a hardwired connection may be made between the officer's device and the vehicle to download the necessary information. Here, the device may be plugged into an external port, e.g., via a USB-C or other cabled connection. Any of these approaches may be used with two-factor authentication and encryption to make the shared information as secure as possible.

In some instances, the vehicle may not satisfy all of the checks at the weigh station. For instance, tire tread depth or tire pressurization may not meet a threshold level, or one or more lights may need replacing. As such, the vehicle may not be cleared to proceed along its planned route in an autonomous mode. In this case, the vehicle may be required to have tow truck take the vehicle to a service center. Or the vehicle may only be authorized to proceed along the route with a human driver. In these situations, the vehicle may need to wait at the weigh station while a driver or tow truck is dispatched to the location. If the repair is straightforward (e.g., tire pressure or something minor), then the tow service or other roadside assistance service could handle it at the weigh station location. Or, alternatively, the inspection officer or other personnel at the weigh station may be granted permission to perform the repair. According to one aspect of the technology, a remote assistance service may maintain a database of all reasons that autonomous vehicles of a fleet have failed inspection. The system can then make such reasons part of the pre-trip checklist for the vehicles. It may also involve other actions to improve current processes to reduce the likelihood of inspection failure.

Figure 8A:
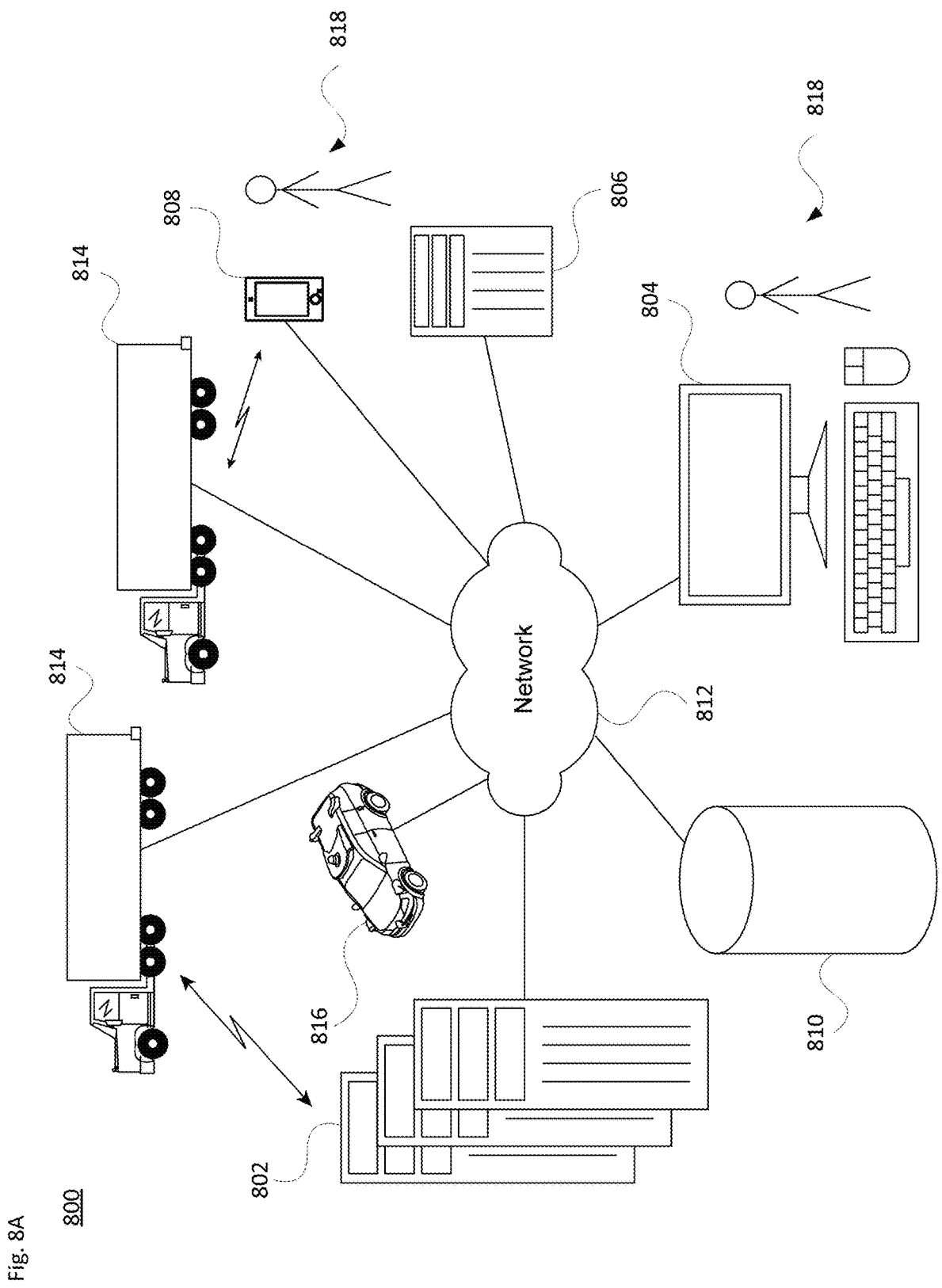
FIGS. 8A-B illustrate an example arrangement in accordance with aspects of the technology.
Figure 8B:
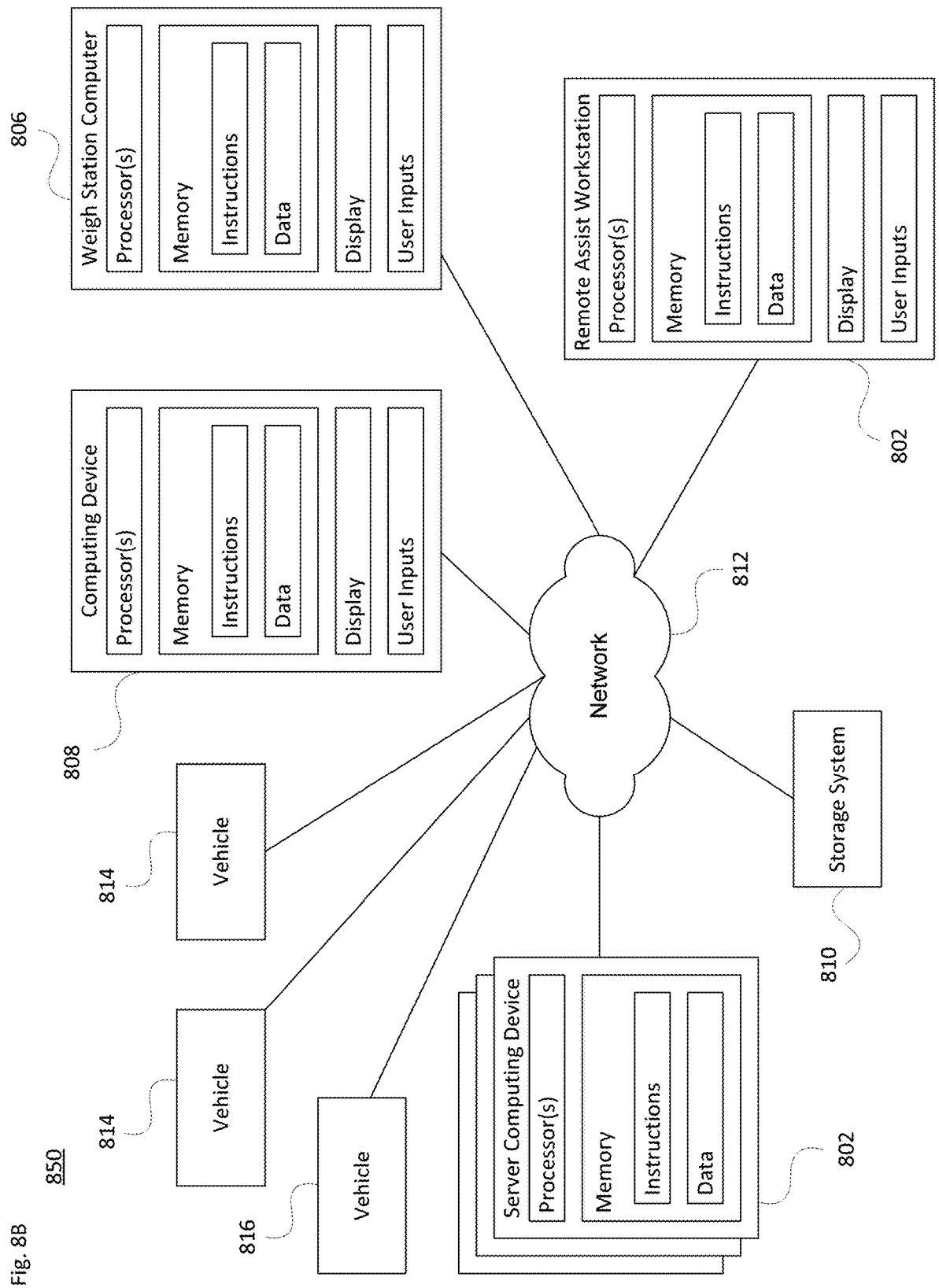

The vehicle's on-board control system may communicate with remote assistance, an inspection officer or the inspection station control center, as well as with service personnel and human drivers or passengers of the vehicle. One example of this is shown in FIGS. 8A and 8B. In particular, FIGS. 8A and 8B are pictorial and functional diagrams, respectively, of an example arrangement 800 that includes a plurality of computing devices 802, 804, 806, 808 and a storage system 810 connected via a network 812. System 800 also includes vehicles 814 and 816, which may be configured the same as or similarly to vehicles 100 and 150 of FIGS. 1A-B and 1C. Vehicle 814 and/or vehicles 816 may be part of a fleet of vehicles. Although only a few vehicles and computing devices are depicted for simplicity, a typical arrangement may include significantly more.

As shown in FIG. 8B, each of computing devices 802, 804, 806 and 808 may include one or more processors, memory, data and instructions. Such processors, memories, data and instructions may be configured similarly to the ones described above with regard to FIG. 2A. The various computing devices and vehicles may communication via one or more networks, such as network 812. The network 812, and intervening nodes, may include various configurations and protocols including short range communication protocols such as Bluetooth™, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces. Alternatively or in addition, the vehicles may be able to communicate directly with any of devices 802, 804, 806 and/or 808.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance, computing device 802 may include one or more server computing devices that are capable of communicating with the computing devices of vehicles 814 and/or 816, as well as computing devices 804, 806 and 808 via the network 812. For example, vehicles 814 and/or 816 may be a part of a fleet of vehicles that can be dispatched by a server computing device to various locations. In this regard, the computing device 802 may function as a dispatching server computing system which can be used to dispatch vehicles to different locations in order to pick up and deliver cargo and/or to pick up and drop off passengers. In addition, vehicles 814 and/or 816 may also directly or indirectly with other fleet vehicles, service vehicles, and the like. In addition, server computing device 802 may use network 812 to transmit and present information to a user of one of the other computing devices or a passenger of a vehicle. In this regard, computing devices 804, 806 and 808 may be considered client computing devices.

As shown in FIG. 8A, computing devices 804, 806 and 808 may be computing devices intended for use by respective users 818, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The computing devices may also include a camera for recording video streams, speakers, a network interface device, and all of the components used for connecting these elements to one another.

Although these computing devices may each comprise a full-sized personal computing device, they may alternatively comprise mobile computing devices capable of wirelessly exchanging data with a server over a network such as the Internet. By way of example only, computing device 808 may be mobile phones or devices such as a wireless-enabled PDA, a tablet PC, a wearable computing device (e.g., a smartwatch), or a netbook that is capable of obtaining information via the Internet or other networks. Computing device 808 may be employed, e.g., by an inspection officer at the weigh station. Computing device 806 may be a weigh station control computer, which may be able to operate the weigh station in a semi or fully autonomous inspection mode.

In some examples, computing device 804 may be a remote assistance workstation used by an administrator or operator to communicate with vehicles 814 and/or 816. Although only a single remote assistance workstation 804 is shown in FIGS. 8A-8B, any number of such workstations may be included in a given system. Moreover, although workstation 804 is depicted as a desktop-type computer, this device may include various types of personal computing devices such as laptops, netbooks, tablet computers, etc.

Storage system 810 can be of any type of computerized storage capable of storing information accessible by the server computing devices 702, such as a hard-drive, memory card, ROM, RAM, DVD, CD-ROM, flash drive and/or tape drive. In addition, storage system 710 may include a distributed storage system where data is stored on a plurality of different storage devices which may be physically located at the same or different geographic locations. Storage system 810 may be connected to the computing devices via the network 812 as shown in FIGS. 8A-8B, and/or may be directly connected to or incorporated into any of the computing devices.

Storage system 810 may store various types of information. For instance, the storage system 810 may also store autonomous vehicle control software which is to be used by vehicles, such as vehicles 814 or 816, to operate such vehicles in an autonomous driving mode. Alternatively or additionally, storage system 810 may maintain various types of information regarding the vehicles and their cargo, including bills of lading and other documentation, logs, etc. This information may be retrieved or otherwise accessed by a server computing device, such as one or more server computing devices 802, in order to perform some or all of the features described herein.

As discussed above, the self-driving vehicle may communicate with remote assistance in order to interpret inspection officer commands or other signals. For instance, should the vehicle be unable to determine what to do, it may send a query and/or data to remote assistance. The query may include a request for support. The data may include raw and/or processed sensor data, vehicle log data and the like. For instance, it may include one or more still images, video and/or an audio segment(s) associated with the inspection officer's command, body language, displayed signage etc.

In response, the remote assistance service can provide support to the vehicle, e.g., to interpret signals, cues or commands from the inspection officer. The storage system 810 may maintain a database of information associated with a standardized set of signals (e.g., images, audio files, classified objects). This information can be used remotely, e.g., by remote assistance computer 804 or server 802 to perform offboard analysis by comparing the signal(s) against information received from the perception system. Here, upon identification of the particular signal, the remote assistance service or server may instruct the vehicle what action or operation to perform in response to the identified signal.

In a situation where there are passengers, the vehicle or remote assistance may communicate directly or indirectly with the passengers' client computing device. Here, for example, information may be provided to the passengers regarding the current situation, actions being taken or to be taken in response to the situation, etc.

Figure 9:
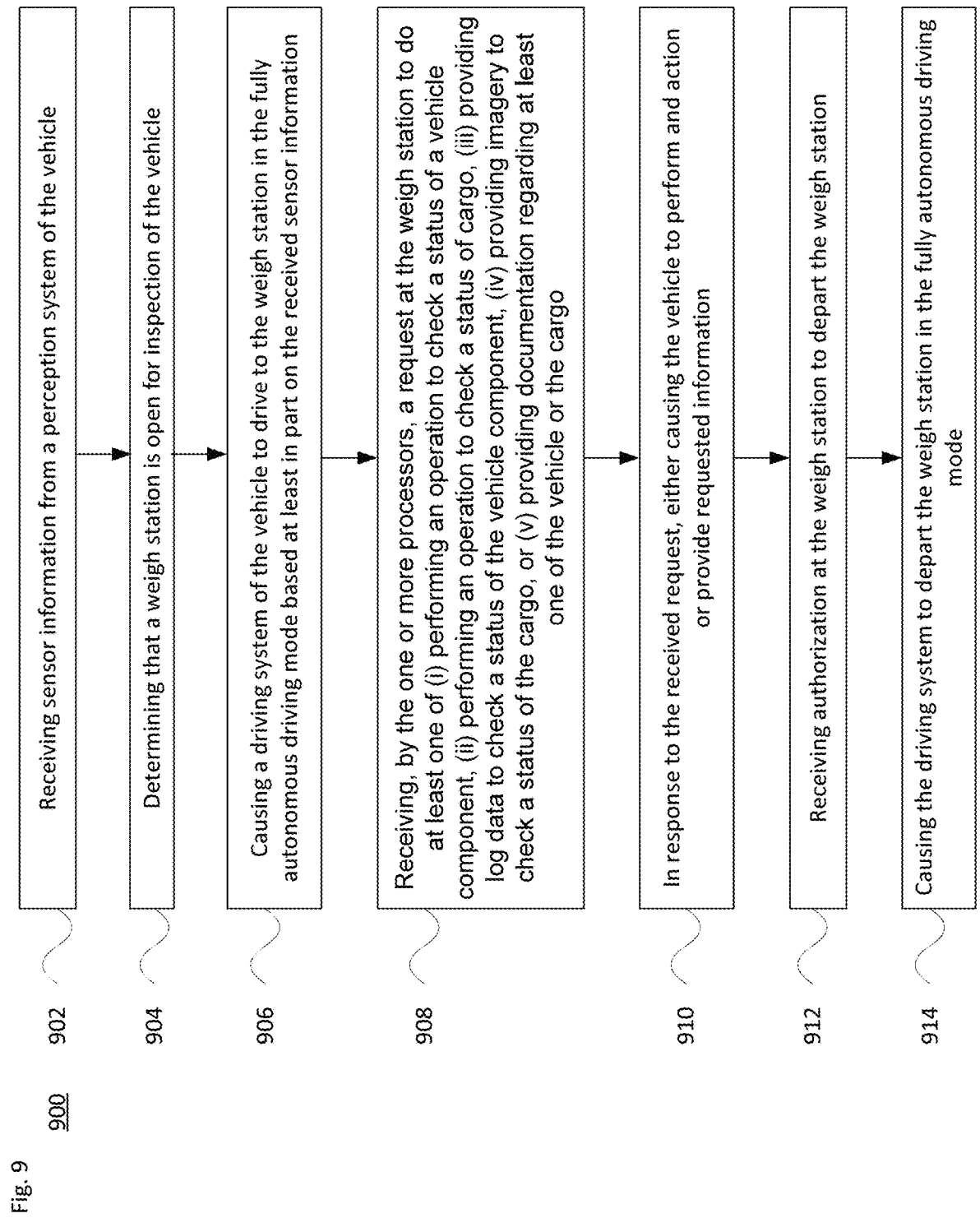
FIG. 9 illustrates an example method of operating a vehicle in accordance with aspects of the technology.

FIG. 9 illustrates an example 900 of a method of operating a vehicle in a fully autonomous driving mode in view of the above. At block 902, one or more processors of the vehicle receive sensor information from a perception system of the vehicle. At block 904, a determination is made that a weigh station is open for inspection of the vehicle. At block 906, the one or more processors cause a driving system of the vehicle to drive to the weigh station in the fully autonomous driving mode based at least in part on the received sensor information. At block 908, the one or more processors receive a request at the weigh station to do at least one of (i) performing an operation to check a status of a vehicle component, (ii) performing an operation to check a status of cargo, (iii) providing log data to check a status of the vehicle component, (iv) providing imagery to check a status of the cargo, or (v) providing documentation regarding at least one of the vehicle or the cargo. At block 910, in response to the received request, the one or more processors either cause the vehicle to perform an action or to provide requested information. At block 912, the one or more processors receive authorization at the weigh station to depart the weigh station. And at block 914, in response to the authorization, the one or more processors cause the driving system of the vehicle to depart the weigh station in the fully autonomous driving mode.

Figure 10:
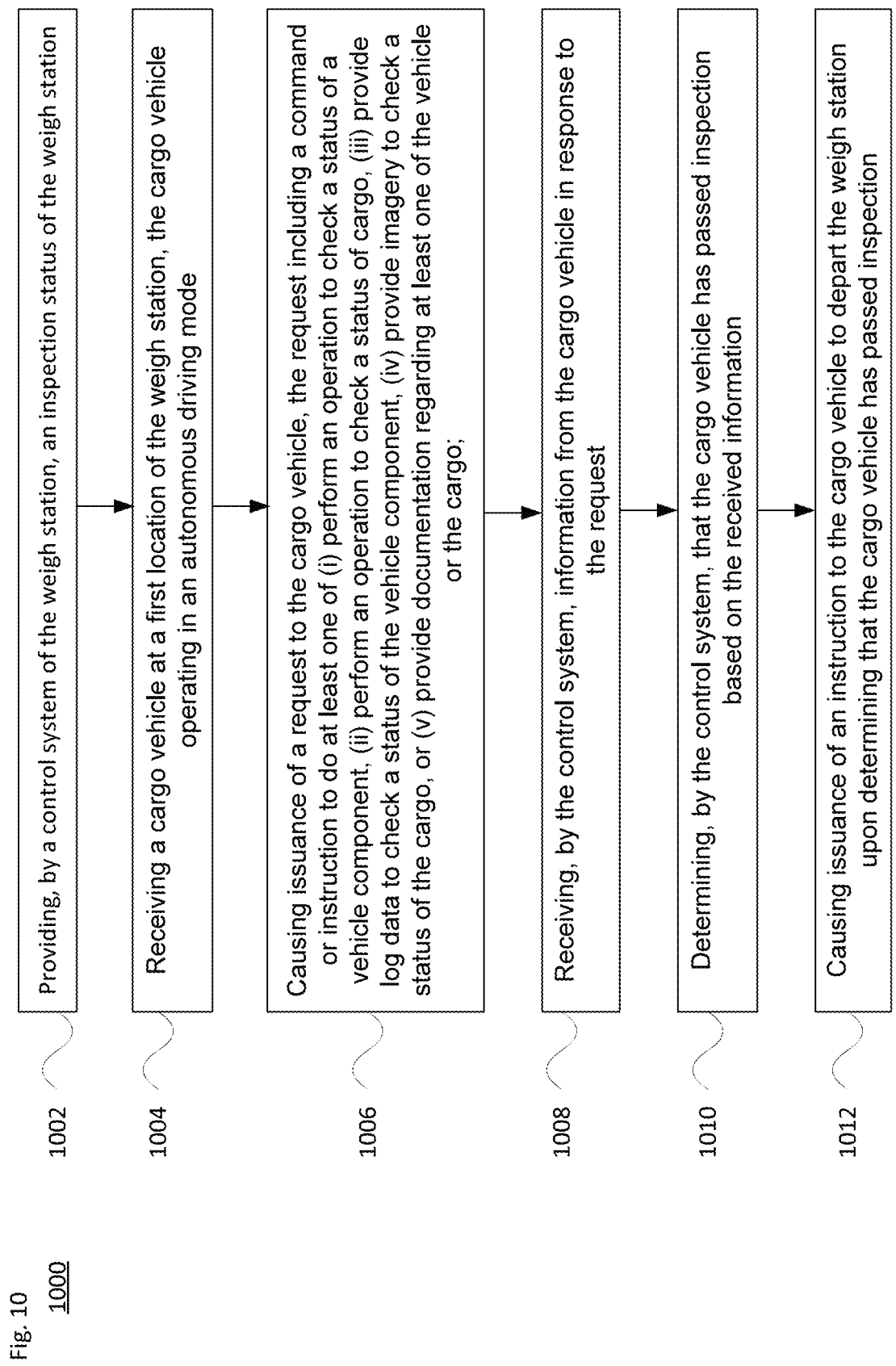
FIG. 10 illustrates an example method of operating a weigh station facility in accordance with aspects of the technology.

FIG. 10 illustrates an example 1000 of a method of operating a weigh station in view of the above. At block 1002, a control system of the weigh station provides an inspection status of the weigh station. At block 1004, a cargo vehicle is received at a first location of the weigh station, in which the cargo vehicle operates in an autonomous driving mode. At block 1006, the method includes causing issuance of a request to the cargo vehicle, in which the request includes a command or instruction to do at least one of (i) perform an operation to check a status of a vehicle component, (ii) perform an operation to check a status of cargo, (iii) provide log data to check a status of the vehicle component, (iv) provide imagery to check a status of the cargo, or (v) provide documentation regarding at least one of the vehicle or the cargo. At block 1008, the control system receives information from the cargo vehicle in response to the request. At block 1010, the control system determines that the cargo vehicle has passed inspection based on the received information. And at block 1012, the method includes issuing an instruction to the cargo vehicle to depart the weigh station upon determining that the cargo vehicle has passed inspection.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method of operating a cargo vehicle in an autonomous driving mode, the method comprising:
   determining an operational status of whether a weigh station is open for vehicle inspections;
   adjusting, by one or more processors of a control system of the vehicle based on upon the determined status of the weigh station, at least one of a planned route, speed or travel lane for a trip of the vehicle in the autonomous mode;
   causing, by the one or more processors, a driving system of the vehicle to drive to the weigh station in the autonomous driving mode in accordance with the adjusting;
   receiving, by the one or more processors, a request from the weigh station; and
   in response to the received request, the one or more processors:
   causing the vehicle to perform an operation, wherein the operation includes checking a status of a vehicle component or checking a status of cargo; and providing information associated with the trip, the information including at least one of log data about the vehicle component or documentation regarding the vehicle or the cargo.

2. The method of claim 1, further comprising, upon determining the operational status that the weigh station is open for vehicle inspection, the one or more processors scheduling a time for inspection of the vehicle.

3. The method of claim 2, wherein scheduling the time for inspection of the vehicle is performed by the one or more processors based on a planned route of the vehicle, a traffic condition, a weather condition, or a schedule at the weigh station.

4. The method of claim 2, wherein scheduling the time for inspection of the vehicle by the one or more processors is arranged via a direct communication with the weigh station.

5. The method of claim 2, wherein scheduling the time for inspection of the vehicle by the one or more processors is arranged via a communication with a central management system associated with the vehicle.

6. The method of claim 1, further comprising, upon receiving authorization to depart the weigh station, the one or more processors causing the driving system of the vehicle to depart the weigh station in the autonomous driving mode.

7. The method of claim 1, further comprising, prior to arrival at the weigh station, capturing imagery using one or more sensors of a perception system of the vehicle, and providing the imagery when checking the status of the cargo.

8. The method of claim 1, wherein determining the operational status that the weigh station is open for vehicle inspection includes at least one of:
receiving, by the one or more processors, a notification from a remote assistance service;
sending, by the one or more processors, a query requesting a status for one or more weigh stations along a planned route of the vehicle; or
receiving, by the one or more processors, a communication from the weigh station that the weigh station is open.

9. The method of claim 1, wherein the documentation includes a bill of lading.

10. The method of claim 1, wherein determining the operational status of whether the weigh station is open for vehicle inspections is part of a pre-trip checklist performed by the one or more processors prior to initiating the trip in the autonomous mode.

11. A method of operating a cargo vehicle in an autonomous driving mode, the method comprising:
causing, by one or more processors of a control system of the vehicle in response to an indication that a weigh station is open for instruction, a driving system of the vehicle to drive to the weigh station in the autonomous driving mode;
receiving, by the one or more processors, a request from the weigh station to do at least one of (i) performing an operation to check a status of a vehicle component, (ii) performing an operation to check a status of cargo, (iii) providing log data to check a status of the vehicle component, (iv) providing imagery to check a status of the cargo, or (v) providing documentation regarding at least one of the vehicle or the cargo;
interpreting, by the one or more processors, the received request from the weigh station; and
upon interpreting the received request, the one or more processors either:
causing the vehicle to perform the operation to check the status of the vehicle component,
causing the vehicle to perform the operation to check the status of cargo,
providing the log data to check the status of the vehicle component,
providing the imagery to check the status of the cargo, or
causing the documentation to be provided regarding at least one of the vehicle or the cargo.

12. The method of claim 11, wherein receiving the request includes detecting a command at the weigh station using one or more sensors of a perception system of the vehicle.

13. The method of claim 12, wherein detecting the command using the one or more sensors includes detecting information provided by an inspection officer at the weigh station.

14. The method of claim 12, wherein detecting the command includes perceiving, by the one or more sensors: (i) at least one hand signal by an inspection officer, (ii) one or more movements of the inspection officer, (iii) body language of the inspection officer, (iv) one or more verbal commands by the inspection officer, (v) signage, or (vi) information received from a computing device at the weigh station.

15. The method of claim 12, further comprising the vehicle requesting clarification of the request.

16. The method of claim 15, wherein requesting clarification includes the vehicle emitting either visual or audible information that requests repetition of the request.

17. The method of claim 11, wherein providing the log data or providing the imagery includes establishing a wireless communication link with a device at the weigh station.

18. The method of claim 11, wherein providing the log data or providing the imagery includes transmitting the log data or the imagery via a hardwired connection to a communication device at the weigh station.

19. The method of claim 11, further comprising, upon not satisfying all checks at the weigh station, either:
adjusting, by the one or more processors, a trip plan of the vehicle;
adjusting a driving mode of the vehicle from the autonomous driving mode to a different mode; or
communicating with a support entity, by the one or more processors, to request assistance.

20. The method of claim 19, wherein communicating with the support entity further includes notifying a passenger of the vehicle about a current status of the vehicle.

* * * * *